United States Patent
Inuzuka et al.

(10) Patent No.: US 6,992,676 B2
(45) Date of Patent: *Jan. 31, 2006

(54) IMAGE DISPLAY SYSTEM

(75) Inventors: Tatsuki Inuzuka, Mito (JP); Tsunenori Yamamoto, Hitachi (JP); Ikuo Hiyama, Hitachinaka (JP); Makoto Tsumura, Hitachi (JP); Yasutaka Toyoda, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/916,454

(22) Filed: Aug. 12, 2004

(65) Prior Publication Data

US 2005/0012754 A1    Jan. 20, 2005

Related U.S. Application Data

(63) Continuation of application No. 09/942,799, filed on Aug. 31, 2001, now Pat. No. 6,784,891.

(30) Foreign Application Priority Data

Feb. 28, 2001 (JP) .............................. 2001-053539

(51) Int. Cl.
*G06T 9/00* (2006.01)
(52) U.S. Cl. .................... 345/555; 345/556; 382/232
(58) Field of Classification Search ............... 345/555, 345/547, 556; 382/232, 235; 358/501
See application file for complete search history.

(56) References Cited

U.S. PATENT DOCUMENTS

| | | | |
|---|---|---|---|
| 4,979,041 A | 12/1990 | Schreiber | |
| 5,825,408 A | 10/1998 | Yuyama et al. | |
| 5,914,755 A | 6/1999 | Ito et al. | |
| 5,953,074 A | 9/1999 | Reddy | |
| 6,018,362 A * | 1/2000 | Suzuki et al. | 348/220.1 |
| 6,337,928 B1 | 1/2002 | Takahashi et al. | |
| 6,654,498 B2 | 11/2003 | Takahashi et al. | |

FOREIGN PATENT DOCUMENTS

| | | |
|---|---|---|
| JP | 9-247654 | 9/1997 |
| JP | 10-2001-0053295 | 7/2003 |

* cited by examiner

*Primary Examiner*—Ulka J. Chauhan
*Assistant Examiner*—Mackly Monestime
(74) *Attorney, Agent, or Firm*—Antonelli, Terry, Stout and Kraus, LLP.

(57) ABSTRACT

A control device, which is capable of suppressing an increase in a load of a data transfer for an increase of an amount of data is provided. The control device includes a compressed data generation unit for generating a compressed data based on a set-up value inputted, and a controller for outputting a frame rate information to the compressed data generation unit, and for making compressed data to be outputted from a memory for use in storing a compressed data to an image display device in accordance with the frame rate.

4 Claims, 22 Drawing Sheets

FIG.3

ADDRESS GENERATION CONTROL SIGNAL

| SIGNAL | SETTING POINT(S) | SETTING CONDITION(S) |
|---|---|---|
| FRAME RATE | STILL-PICTURE AREA FRAME RATE<br><br>ANIMATION AREA FRAME RATE | • THE HIGHEST FRAME RATE WITH WHICH THE DISPLAY DEVICE CAN DEAL<br>• THE HIGHEST TRANSMISSION RATE OF THE CONNECTION IF WITH THE DISPLAY DEVICE<br>• THE NUMBER OF PIXELS<br>• THE COMPRESSION RATE |
| BLOCK SIZE | THE NUMBER OF PIXELS IN VERTICAL/HORIZONTAL DIRECTIONS IN THE STILL-PICTURE AREA<br><br>THE NUMBER OF PIXELS IN VERTICAL/HORIZONTAL DIRECTIONS IN THE ANIMATION AREA | • THE RESOLUTION OF THE DISPLAY DEVICE<br>• THE DISPLAY BLOCK SIZE OF THE DISPLAY DEVICE |
| THE NUMBER OF ANALOGOUS COLORS | THE NUMBER OF ANALOGOUS COLORS WITHIN THE BLOCK OF THE STILL-PICTURE AREA<br><br>THE NUMBER OF ANALOGOUS COLORS WITHIN THE BLOCK OF THE ANIMATION AREA | • THE RESOLUTION OF THE DISPLAY DEVICE<br>• THE DISPLAY BLOCK SIZE OF THE DISPLAY DEVICE |
| AREA SIGNAL(S) | THE VERTICAL/HORIZONTAL STARTING POSITIONS OF THE ANIMATION AREA<br><br>THE VERTICAL/HORIZONTAL SIZES OF THE ANIMATION AREA | • CONCLUTION(S) OF THE AREA SEPARATION DEVICE |
| CLOCK | COMPRESSED DATA GENERATION CLOCK | COMPRESSED DATA GENERATION CLOCK |

FIG.4
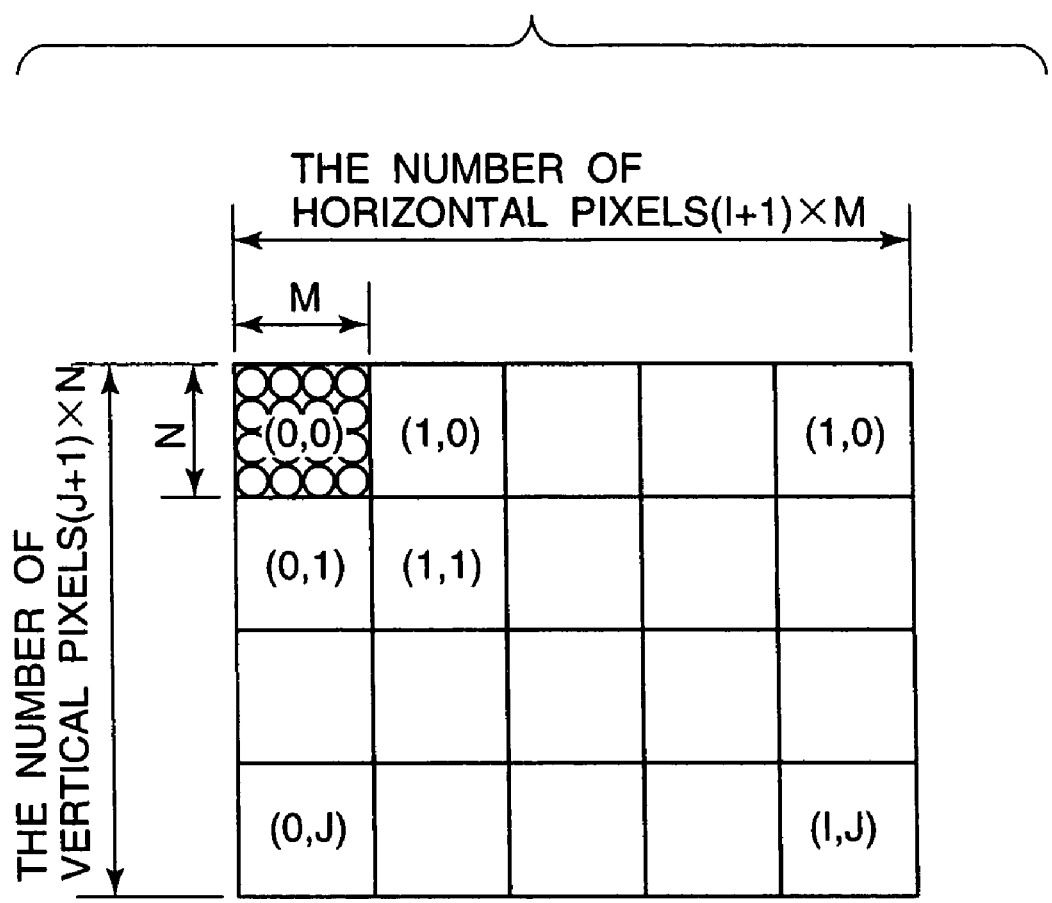
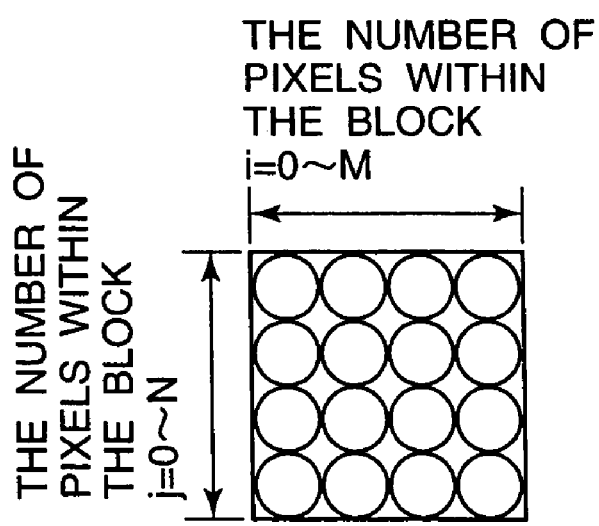

FIG.5
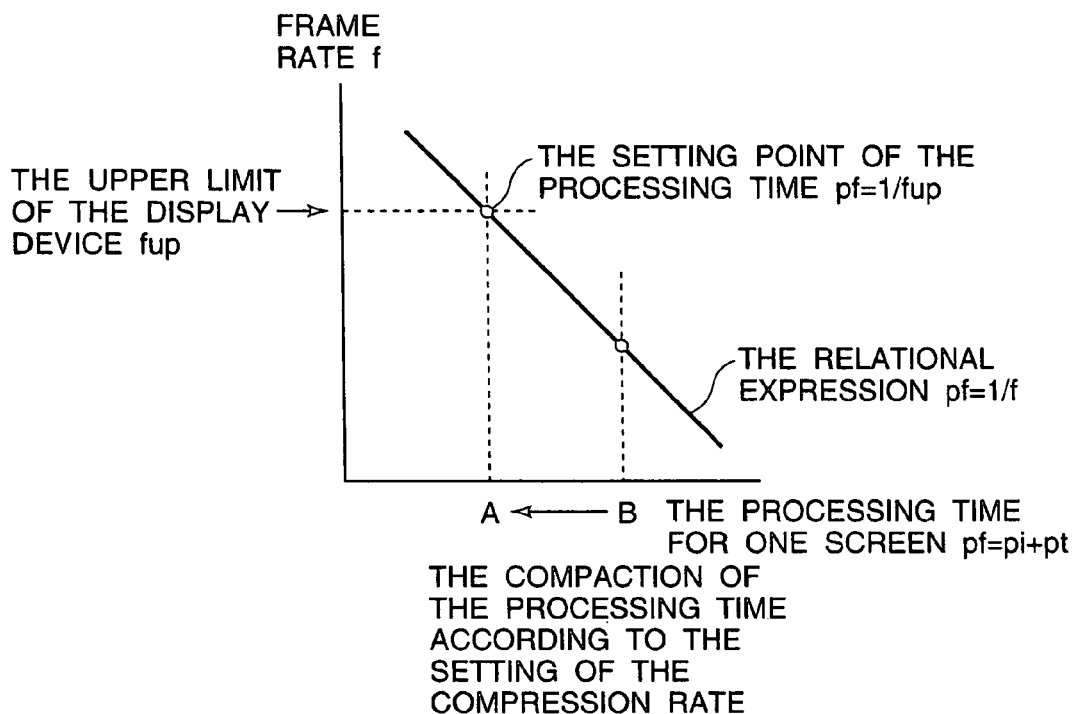
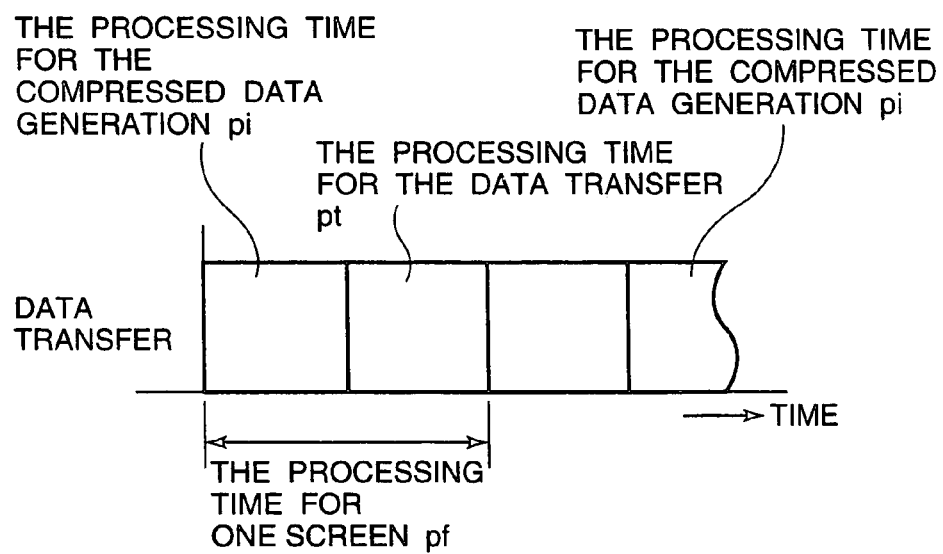

BLOCK A
(R0,G0,B0)=(0,0,0)
(R1,G1,B1)=(255,255,255)
Sel=(1,1,1,1,1,1,1,0,1,1,0,0,1,1,1,0)

BLOCK B
(R0,G0,B0)=(0,0,0)
(R1,G1,B1)=(255,255,255)
Sel=(1,1,1,0,1,1,1,0,1,1,1,0,1,1,0,0)

BLOCK C
(R0,G0,B0)=(0,0,0)
(R1,G1,B1)=(255,255,255)
Sel=(0,1,1,1,0,1,1,1,0,1,1,1,0,1,1,1)

BLOCK D
(R0,G0,B0)=(0,0,0)
(R1,G1,B1)=(255,255,255)
Sel=(1,1,1,1,0,1,1,1,0,1,1,1,0,0,1,1)

FIG.15
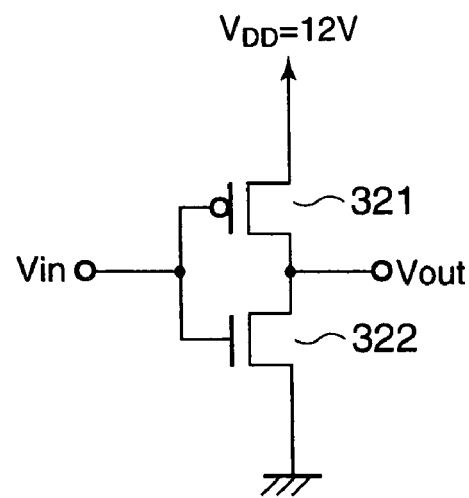
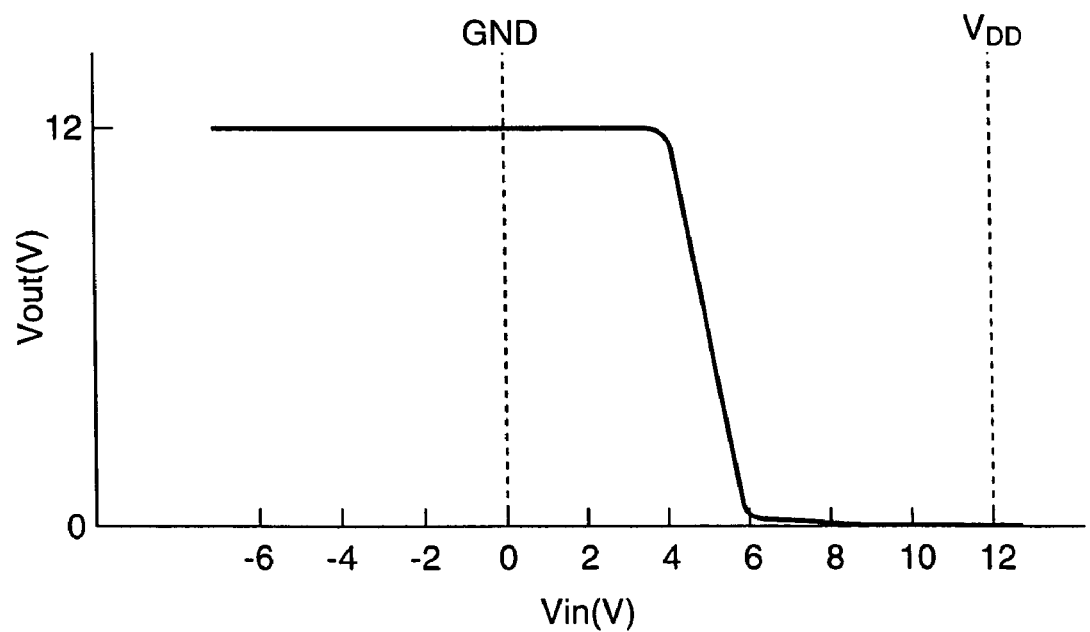

FIG.16A

SELECTION PERIOD OF TIME $t_1$:

THE FIRST ROW~
THE FOURTH ROW
  $Vin(t_1)=(V_X(t_1)+V_X(t_1))/2$
       $=(V_X(t_1)+20)/2 \geqq 6$ THE FIFTH ROW~
THE EIGHTH ROW
  $Vin(t_1)=(V_X(t_1)+V_X(t_1))/2$
       $=(V_X(t_1)+0)/2 \leqq 4$ $V_X(t_1)$: 4, 8, 8, 4, 0, -4, -8, -8

$V_Y(t_1)$:

| | 4 | 8 | 8 | 4 | 0 | -4 | -8 | -8 |
|---|---|---|---|---|---|---|---|---|
| 20 | 12 | 14 | 14 | 12 | 10 | 8 | 6 | 6 |
| 20 | 12 | 14 | 14 | 12 | 10 | 8 | 6 | 6 |
| 20 | 12 | 14 | 14 | 12 | 10 | 8 | 6 | 6 |
| 20 | 12 | 14 | 14 | 12 | 10 | 8 | 6 | 6 |
| 0 | 2 | 4 | 4 | 2 | 0 | -2 | -4 | -4 |
| 0 | 2 | 4 | 4 | 2 | 0 | -2 | -4 | -4 |
| 0 | 2 | 4 | 4 | 2 | 0 | -2 | -4 | -4 |
| 0 | 2 | 4 | 4 | 2 | 0 | -2 | -4 | -4 |

FIG.16B

SELECTION PERIOD OF TIME $t_2$:

THE FIRST ROW~
THE FOURTH ROW
  $Vin(t_2)=(V_X(t_2)+V_X(t_2))/2$

THE FIFTH ROW~
THE EIGHTH ROW
  $Vin(t_2)=(V_X(t_2)+V_X(t_2))/2$
       $=(V_X(t_2)+20)/2 \geqq 6$ $V_X(t_2)$: 0, -4, -4, 0, 4, 0, -4, -8

$V_Y(t_2)$:

| | 0 | -4 | -4 | 0 | 4 | 0 | -4 | -8 |
|---|---|---|---|---|---|---|---|---|
| 4 | 2 | 0 | 0 | 2 | 4 | 2 | 0 | -2 |
| 8 | 4 | 2 | 2 | 4 | 6 | 4 | 2 | 0 |
| 12 | 5 | 4 | 4 | 6 | 8 | 6 | 4 | 2 |
| 16 | 6 | 6 | 6 | 8 | 10 | 8 | 6 | 4 |
| 20 | 10 | 8 | 8 | 10 | 12 | 10 | 8 | 6 |
| 20 | 10 | 8 | 8 | 10 | 12 | 10 | 8 | 6 |
| 20 | 10 | 8 | 8 | 10 | 12 | 10 | 8 | 6 |
| 20 | 10 | 8 | 8 | 10 | 12 | 10 | 8 | 6 |

FIG.16C

SELECTION PERIOD OF TIME $t_3$:

THE FIRST ROW~
THE FOURTH ROW
  $Vin(t_3)=(V_X(t_3)+V_X(t_3))/2$
       $=(V_X(t_3)+0)/2 \leqq 4$ THE FIFTH ROW~
THE EIGHTH ROW
  $Vin(t_3)=(V_X(t_3)+V_X(t_3))/2$ $V_X(t_3)$: -4, 0, 0, 0, 0, -4, -8, -8

$V_Y(t_3)$:

| | -4 | 0 | 0 | 0 | 0 | -4 | -8 | -8 |
|---|---|---|---|---|---|---|---|---|
| 0 | -2 | 0 | 0 | 0 | 0 | -2 | -4 | -4 |
| 0 | -2 | 0 | 0 | 0 | 0 | -2 | -4 | -4 |
| 0 | -2 | 0 | 0 | 0 | 0 | -2 | -4 | -4 |
| 0 | -2 | 0 | 0 | 0 | 0 | -2 | -4 | -4 |
| 4 | 0 | 2 | 2 | 2 | 2 | 0 | -2 | -2 |
| 8 | 2 | 4 | 4 | 4 | 4 | 2 | 0 | 0 |
| 12 | 4 | 6 | 6 | 6 | 6 | 4 | 2 | 2 |
| 16 | 6 | 8 | 8 | 8 | 8 | 6 | 4 | 4 |

FIG.19

TRANSFER DATA FORMAT

| ITEM NUMBER | DEVICE CAPABILITY NEGOCIATION ITEM | SIGNAL EXAMPLE |
|---|---|---|
| 1 | HEAD IDENFIFICATION SIGNAL | |
| 2 | SCREEN SIZE | |
| 3 | FRAME RATE | |
| 4 | COLOR FILTER ARRANGEMENT | |
| 5 | COLOR TEMPERATURE OF ILLUMINATION | |
| 6 | COMPRESSED DATA TYPE | |
| 7 | AREA SEPARATION | |
| 8 | RESERVE | |
| 9 | TERMINATION IDENTIFICATION SIGNAL | |

FIG.20

TRANSFER DATA FORMAT

| ITEM NUMBER | COMPRESSED DATA TRANSFER | SIGNAL EXAMPLE |
|---|---|---|
| 1 | HEAD IDENFIFICATION SIGNAL | |
| 2 | COMPRESSION METHOD | |
| 3 | AREA SEPARATION SET-UP VALUE(S) | |
| 4 | ANIMATION/STILL-PICTURE SET-UP VALUE(S) | |
| 5 | RESERVE | |
| 6 | COMPRESSED DATA TRANSFER ORDER | |
| 7 | NUMBER OF TRANSFER BLOCKS | |
| 8 | COMPRESSED DATA ... ... ... | |
| 9 | TERMINATION IDENTIFICATION SIGNAL | |

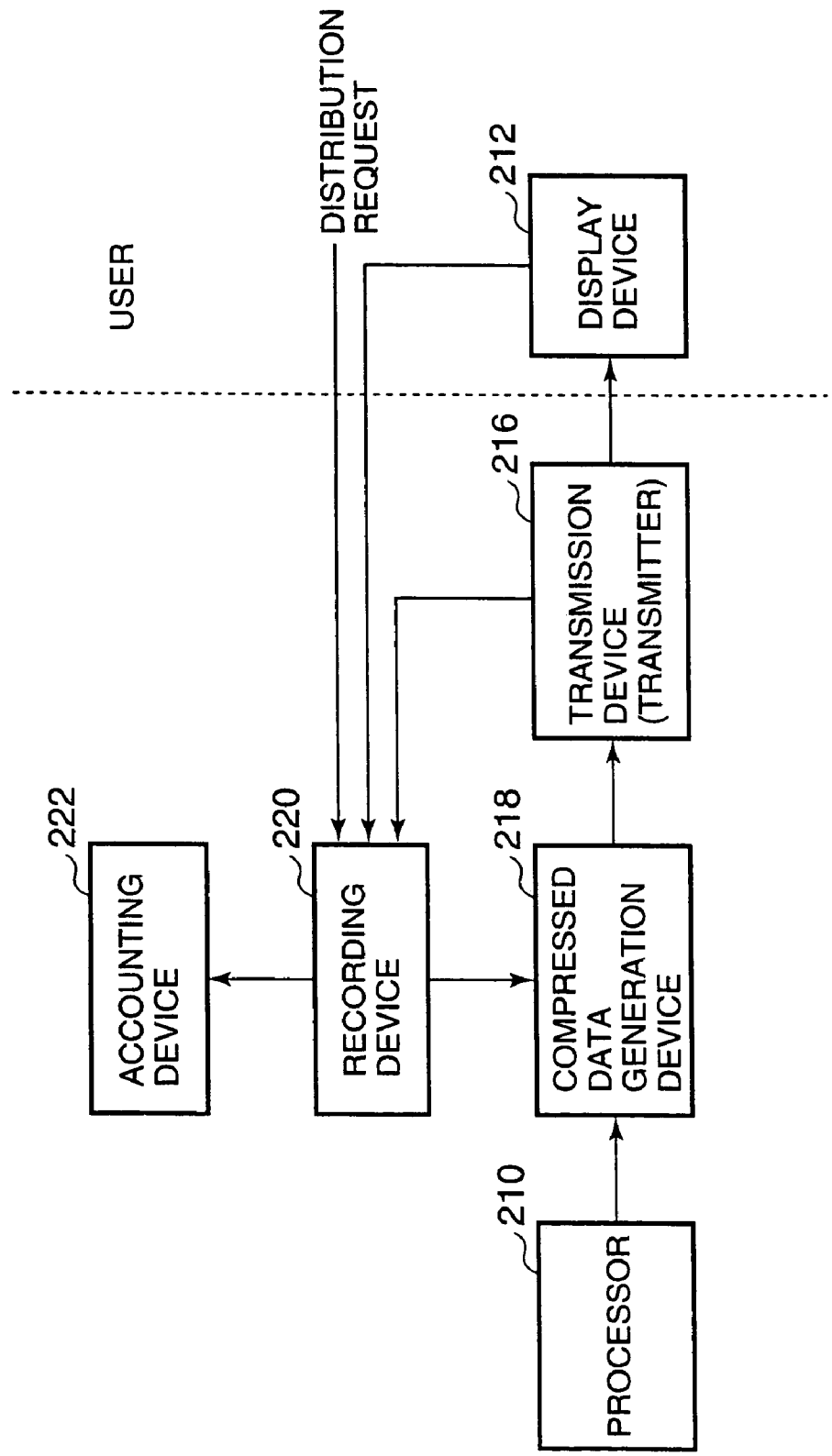

IMAGE DISPLAY SYSTEM

This application is a continuation of application Ser. No. 09/942,799, filed on Aug. 31, 2001, now U.S. Pat. No. 6,784,891. The contents of application Ser. No. 09/942,799 are hereby incorporated herein by reference in their entirety.

BACKGROUND OF THE INVENTION

1. Field of the Invention

The present invention relates to an image display system, and more particularly to an image display system suitable for performing a signal processing of a color image data using a compressed data.

2. Description of the Related Art

Conventionally, at a time when transmitting/receiving a color image, for example, it is adopted a system of setting up a screen on which a plurality of pixels are arranged, of defining a scanning system of pixels that constitute the screen, as well as of sequentially transmitting color image data with respect to each pixel based on this scanning procedure, for a television transmitter, and of displaying the received color image data in a defined scanning order, on a receiver side. For example, a CRT (Cathode Ray Tube) is configured to perform a display for each pixel by projecting an electron beam that is narrowly focused, onto a surface of a fluorescent material, and then to display a color image over an entire screen by scanning the electron beam. In this case, in high vision broadcasting for a purpose of an enhancement of an image quality, the number of pixels that constitute the screen has been increased comparing to the conventional television broadcasting. Further, in a display device that is used in a computer terminal and the like, at a time when enhancing a quality of an image, it is adopted a system of increasing the number of rewritings (frame rates) of the display screen as well as an increase of the number of pixels.

On one hand, in a liquid crystal display device, a plasma display device and the like, it is adopted a structure (configuration) of constituting a pixel that becomes a unit of a display as a circuit-like, and of displaying a color image on a screen, by supplying a display signal to each pixel while selecting each pixel. In this kind of display device, it is constituted to display a color image by inputting data with respect to a color image through a wire from a display control device that creates or stores a display data, supplying the inputted data to each pixel using a driver circuit, and then driving each pixel sequentially. In this case, as a method of enhancing a quality of an image to be displayed, increasing the number of pixels within the screen and/or of increasing the frame rate are/is adopted.

Incidentally, in-order to enhance an image quality, if the number of pixels and the frame rate are increased, and thus a capacity of the image data increases, so that, as a method of decreasing the capacity of the image data, it has been proposed a compression system that utilizes a characteristic of an image signal. As one example, in a still-picture, the JPEG (Joint Photographic Expert Group), and in animation, the MPEG (Motion Photographic Expert Group) and the like have been widely adopted. These systems implement a compression processing of a block in which a plurality of pixels are combined as a unit, and for the JPEG, the amount of data of the original picture (image) can be compressed to the degrees of 1/10 to 1/20. As described above, even if it is a case of implementing a data transfer with a limited transmission capacity, by compressing the data, increasing the number of pixels and the frame rate can enhance the image quality.

In general, enhancing an image quality is equivalent to increasing an amount of information to be sensed visually, and this is eventually equivalent to increasing an amount of data to be displayed. As a result, an enhancement of an image quality can be planned, by simply increasing the number of pixels that constitute the screen, or increasing the number of rewritings (the frame rate "f") of the display screen, as in the conventional technology. However, for an increase of the amount of data, it is not possible to increase the number of pixels and the frame rate all together under a certain processing capability.

That is, assuming that a processing time for a sheet of screen is "pf", a time required for a generation or an input of a display data is "pi", and a transfer time of the display data is "pt", then a processing time for the sheet of screen "pf" is expressed as pf=pi+pt. Herein, if the processing time "pf" for the sheet of screen is proportional to the number of pixels, then increasing the number of pixels for the purpose of an enhancement of the image quality causes the processing time "pf" to be extended, and eventually this causes the frame rate "f" to be decreased. That is, if the processing time "pf" for the sheet of screen is a constant (the data generation processing capability=k pixel/sec.), or if the display capability is a constant, the display capability is in a relationship of the display capability=the number of pixels×the frame rate, and thus two parameters such as the number of pixels and the frame rate are in the inversely proportional relationship. In other words, for the increase of the amount of data in the image data, it is not possible to increase two parameters of the number of pixels and the frame rate simultaneously, under a certain device capability.

For example, a so-called VGA screen is constituted of 640 horizontal pixels and 480 vertical pixels, and a so-called UXGA screen is constituted of 3200 horizontal pixels and 2400 vertical pixels, and the ratio of the number of pixels between two screens is 1:25. Further, in the common television broadcasting, a screen of 30 frames per second is transmitted for reproducing and displaying the motion pictures, and on one hand, for a screen display of a computer terminal and the like, a high frame rate such as 120 frame per second is set up, for example, and the ratio between the frame rates in both cases is 1:4.

Now, considering the case that the image data by the VGA screen is transferred in 30 frames/second, and the image data by the QUXGA screen is transferred in 120 frames/second, an amount of data for a display is a multiplication of the frame rate and the number of pixels, and the ratio of the amount of data in both cases is 1:100. Accordingly, if there is no restriction in a data transfer path, at a time when the amount of data increases along with the increase in the data generation capability, the increased data can be easily transferred, if the frame rate is made to be higher, but if the transfer condition of the data transfer path is 30 frames/second, then for transferring the data corresponding to 120 frames/second, the amount of data transfer is restricted by the transfer condition, and thus it can not be dealt with the increase of the amount of data.

As described above, if the processing time "pf" or the display capability for the sheet of screen is a constant, it is not possible to increase the number of pixels and the frame rate simultaneously, along with the increase of the amount of data.

Further, a processing time largely depends on a capability of a device that performs a screen display, and thus it is possible that the device for generating the data and the device for receiving the data have the different capabilities. For example, if a generation capability of a display data is equivalent to the one of television broadcasting, when the display device has the ability of the QUXGA, then an image that can be displayed in practice is equivalent to the one of the television broadcasting. Conversely, even if the processing time "pf" is shortened by increasing the capability of the device that performs the processing, there is a case that an upper limit value of the frame rate "f" possessed by the display device becomes a restriction. As described above, at a time when processing the image data, if the capabilities of the device for generating the data and of the device for receiving the data are not managed, the capabilities of devices can not be utilized sufficiently as a whole system.

SUMMARY OF THE INVENTION

Accordingly, it is an object of the present invention to provide a control device, an image display system, an information processing device, a television receiver, a transmitter and an image distribution system, which are capable of suppressing an increase in a load of a data transfer for an increase of an amount of data.

The above-mentioned object of the present invention can be achieved by a control device, which includes a compressed data generation unit for generating a compressed data based on a set-up value inputted, and a controller for outputting a frame rate information to the compressed data generation unit, and for making compressed data to be outputted from a memory for use in storing a compressed data to an image display device in accordance with the frame rate.

The above mentioned object of the present invention can also be achieved by an image display system, which includes an image display device for displaying an image in accordance with an image information, a memory for storing a compressed data, and a controller for making the compressed data to be outputted from the memory to the image display device in accordance with a frame rate.

The above mentioned object of the present invention can be achieved by an image display system, which includes an image display device for displaying an image in accordance with an image information, a compressed data generation unit for generating a compressed data based on a frame rate and an image information, and a controller for outputting an information of a frame rate to the compressed data generation unit.

The above-mentioned object of the present invention can be achieved by an image display system, which includes an image display device for displaying an image in accordance with an image information, a compressed data generation unit for generating a compressed data based on a frame rate and an image information, and a controller for outputting a frame rate information to the compressed data generation unit, and for making the compressed data to be outputted from a memory for use in storing a compressed data to the image display device in accordance with the frame rate.

The above-mentioned of the present invention can be achieved by an information processing device, which includes an image display device for displaying an image in accordance with an image information, and a control device for outputting an image information to the image display device, wherein the control device includes an image information generation unit for generating an image information, a compressed data generation unit for generating a compressed data based on a frame rate and an image information, and a controller for outputting a frame rate information to the compressed data generation unit, and for making the compressed data to be outputted from a memory for use in storing a compressed data to the image display device in accordance with the frame rate.

The above-mentioned object of the present invention can be achieved by a television receiver, which includes an image display device for displaying an image in accordance with an image information, and a control device for outputting an image information to the image display device, wherein the control device includes a receiving unit for receiving an image information, a compressed data generation unit for generating a compressed data based on a frame rate and an image information received by the receiving unit, and a controller for outputting a frame rate information to the compressed data generation unit, and for making the compressed data to be outputted from a memory for use in storing a compressed data to the image display device in accordance with the frame rate.

The above-mentioned object of the present invention can be achieved by a transmitter, which includes an image information generation unit for generating an image information, a compressed data generation unit for generating a compressed data in accordance with a predetermined transmission rate and the image information, and a transmission unit for transmitting the compressed data.

The above-mentioned object of the present invention can be achieved by an image distribution system, which includes a first recording unit for recording a distribution request from a user and an information about an image display device of which the user possesses, on a recording medium through a telecommunication line, a second recording unit for recording a transmission rate of an image information on the recording medium, a compressing unit for compressing an image information to be displayed on the image display device, in accordance with the distribution request, the information about the image display device and the transmission rate, a transmission unit for transmitting the compressed image information, and an accounting unit for processing the distribution request recorded on the recording medium or the information of the image display device, and for performing an accounting in response to a result of the processing.

According to the above-described units, it is configured to change the compression rate of data along with the frame rate, so that the increase in the load of the data transfer can be suppressed for the increase of the amount of data. More concretely, by increasing the data compression rate along with the increase of the frame rate, the contrary conditions of the number of pixels and of the frame rate can be relaxed. As a result, by transferring the compressed data in which the compression rate of data has been changed along with the frame rate to the image display device, it can be contributed to an enhancement of the image quality.

Further objects and advantages of the invention can be more fully understood from the following detailed description taken in conjunction with the accompanying drawings in which:

BRIEF DESCRIPTION OF THE DRAWINGS

FIG. 3 is a diagram for illustrating the structures of an address generation control signal and a compressed data generation control signal;

FIG. 4 is a diagram for illustrating a relationship between a diagram structure and a pixel block;

FIG. 5 is a diagram for illustrating a relationship between a display device and a display data in a compression rate set-up;

FIG. 15 is a diagram for illustrating an operation of the signal comparator shown in FIG. 14;

FIG. 16 is a diagram for illustrating a control operation of the display device shown in FIG. 12;

FIG. 19 is a diagram for illustrating a negotiation of a device capability;

FIG. 20 is a diagram for illustrating a data structure of a data transfer;

FIG. 22 is a block diagram showing a structure at a time when applying the present invention to an image distribution system;

DESCRIPTION OF THE PREFERRED EMBODIMENT(S)

In the following, the preferred embodiments of the present invention will be described with reference to the accompanying drawings.

Figure 1A:
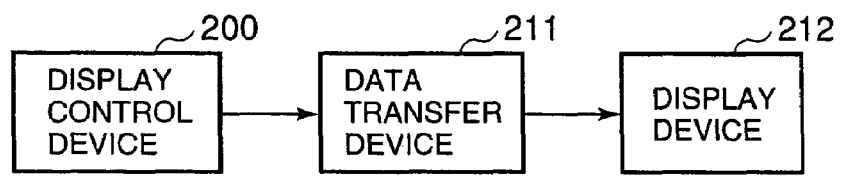
FIG. 1A is a block diagram showing a structure of an image display system according to one embodiment of the present invention.

FIG. 1A is a block diagram showing a structure of an image display system according one embodiment of the present invention. In FIG. 1A, the image display system is constituted of a display control device 200, a data transfer device 211, and a display device (image display device) 212.

Figure 1B:
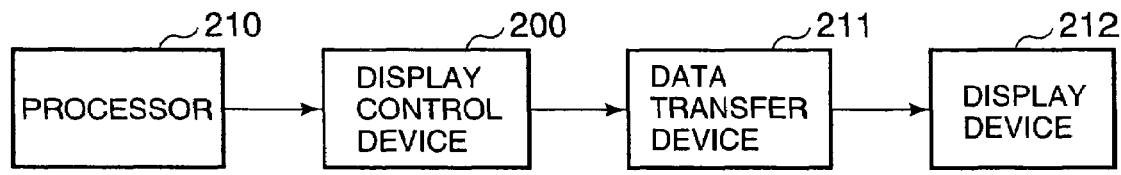
FIG. 1B is a block diagram showing a structure of an image display system according to another embodiment of the present invention.

The display control device 200 is configured to, as an element of a video card, input a screen structure of the display device 212, a data concerning a frame rate (frame rate information) or a color image data as an image information, from a keyboard, for example, to compress the inputted data in a compression rate (data compression rate) matching with a frame rate, and to transfer the compressed data to the display device 212 through the data transfer device 211. At a time when compressing the data, as shown in FIG. 1B, it may also adopt a structure to input an image information, for example, a color image data, according to a generation of the processor (CPU) 210 connected to the display control device 200, and then to compress the inputted data in the display control device 200.

Figure 2:
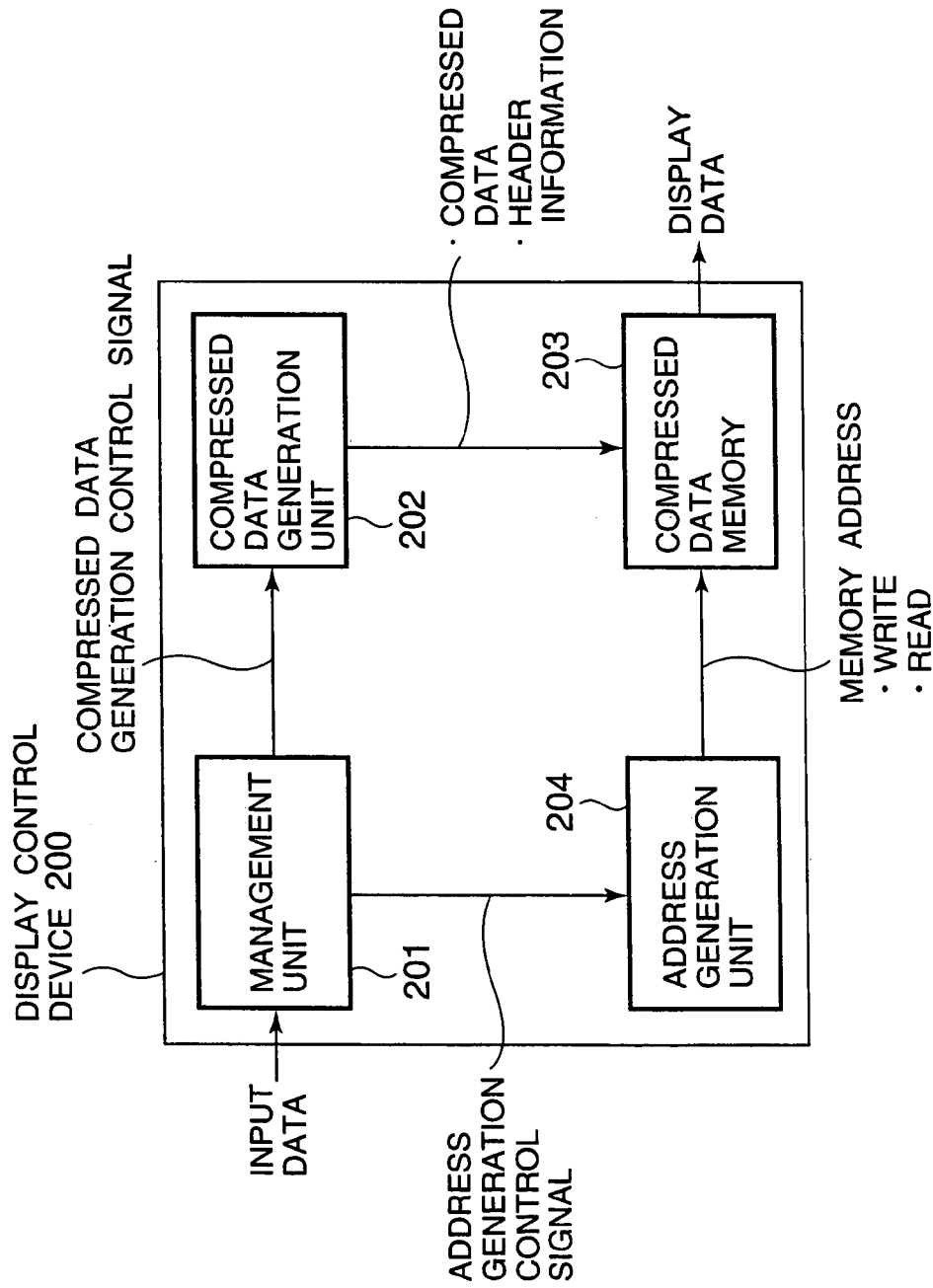
FIG. 2 is a block diagram showing a structure of a display device according to the present invention.

The display device 200 is, as shown in FIG. 2, constituted of a management unit 201, a compressed data generation unit 202, a compressed data memory 203, and an address generation unit 204. The management unit 201 is configured to input a data including a screen structure, a frame rate, and a color image information, to generate a compressed data generation control signal and an address generation control signal based on the inputted data, to output the compressed data generation control signal to the compressed data generation unit 202, and to output the address generation control signal to the address generation unit 204.

The compressed data generation signal and the address generation signal are, as shown in FIG. 3, constituted of signals including information of a frame rate (100 fps, 50 fps, . . . ), a block size (1000×1000, 640×480, . . . ), a number of analogous colors (two colors, four colors, . . . ), areas (animation area, still-picture area, . . . ), and a clock.

The address generation unit 204 is configured to generate a write address and a read address, as a memory address associated with each pixel that constitutes the color image, in response to the address generation control signal, and to sequentially output the memory addresses for the write/read to the compressed data memory 203. The memory address for writing the data is generated using the information such as a format and a timing of the data input, a type of the compressed data, a screen structure of the display device 212 and the like. On one hand, the memory address for reading the data is generated using the information such as a type of the compressed data, a screen structure of the display device 212, a frame rate and the like. When performing the read or the write of data in accordance with the memory addresses generated, it is configured to perform a control with a dihedral memory structure in order to prevent the operations of the read and the write of data from interfering each other. Further, when making the type of compressed data and the like to be variables, based on the signal characteristics of image, it enables the generation method of addresses to change in matching with the type of compressed data.

The compressed address generation unit 202 is configured to compress the color image data, in accordance with the frame rate as the set-up value (predetermined value), in response to the compressed data generation control signal, and to transfer the compressed data together with a header information to the compressed data memory 203.

The compressed data memory 203 is configured to store the compressed data into a designated memory area in response to the memory address for the write, as a memory (storage medium) for storing the compressed data, to read the compressed data from the designated memory area in response to the memory address for the read, and to output the compressed data read as a display data to the data transfer device 211.

That is, the management unit 201, the address generation unit 204 are configured to have an capability of a controller so as to output an information concerning the frame rate to the compressed data generation unit 202, at a time when the data concerning the color image data is inputted, as well as to read the compressed data from the compressed data memory 203, in response to the frame rate, and then to cause the compressed data read, as a display data, to be outputted to the display device 212 through the data transfer device 211.

The compressed data generated by the compressed data generation unit 202 is generated in that a block of which a plurality of pixels are combined is a unit, as shown in FIG. 4. It is performed with the block unit when the compressed data generated by the compressed data generation unit 202 is transferred or stored, as well as it is performed with the block unit when an elongation-process is performed on the transferred data. The parameters such as a shape and a size of this block, a number of pixels to be included in the block may be set-up with a fixed value, or it may be set-up as variables based on the characteristics of the image signal, and a compression rate may be established based on the set-up parameters. Further, in a sheet of an image, the parameters may be set-up as variables by separating the image areas based on the signal characteristics. Moreover, when generating a compressed data, it may be generated by implementing a compression process as making an image data for a pixel (of a pixel unit) inputted from the processor 210 to be a subject thereto, or a compressed data may be generated based on a plotting command.

The data transfer device 211 may be constituted of a data transmission line in which a lead is used, as well as of a wireless data transmitting means or an optical data transmission line. In this case, the image data by the compressed data is transferred along with a control signal, and an electric power may be transmitted simultaneously if necessary. Then, if the image data to be transferred follows with a predefined data format, a transmission procedure and the like, the same image data may be rearranged on the receiving side, i.e., the display device 212 side.

The data transfer device 211 is in that an upper limit of a rate with which a data transfer can be made stably is defined in many cases, and in general, a transfer rate is expressed in a unit of bps (bit per second) and the like. This value is to define a time "pt" required for a certain data transfer. Under the condition as the time "pt" being defined, in the present embodiment, as will be described later, assuming the data to be transferred as a compressed type, it is arranged that a substantial transfer rate is enhanced, and the process time "pt" is shortened.

On one hand, the display device 212 is constituted by using a liquid crystal display device of an active matrix type, for example, and an upper limit "fup" of a physical frame rate possessed by the display device itself is set-up, by electrical operation conditions such as an element structure, a wiring, a driver structure and the like. However, in the present invention, because the data compression rate is to be changed in matching with the frame rate, the compressed data would not be elongated, and by directly utilizing it as a display data, an operation condition can be eased by reducing an amount of signal to be driven by a driver, thereby it is arranged to enhance the frame rate "fup" of the display device 212 itself. Further, in a case that an elongation device is integrated into the display device itself, a compatibility of an interface can be implemented, because an operation of a driver of the display device 212, a signal flowing through a wiring, and the like become the same as the ones of the conventional driving conditions per pixel unit.

As described above, the image display system in the present embodiment is planning to enhance a device capability (the upper limit "fup" of the frame rate) of the display device itself, as the above-mentioned capabilities (abilities) to be the fundamental structures, to shorten the process time "pf" (=pi+pt) or to improve a display capability (=the number of pixels×the frame rate), so as to enhance an image quality.

More concretely, as shown in FIG. 5, the frame rate "f" depends on the timing "pf" of the display data inputted into the display device, and it becomes as "f=1/pf". As a result, it is arranged to set-up the processing time "pf" in such a manner that the "f" approaches to the "fup".

Herein, if the processing time "pf" could be 1/2 as a result of the compression rate of data being 1/2, then, from the above-mentioned relational expression, the frame rate capable of displaying the inputted data can be set-up in two-holds. However, the upper limit value "fup" defined by the device capability of the display device itself can not be exceeded. Accordingly, the processing time "pf" can be defined as the upper limit value "fup" being the constraint.

Further, by using the display control device 200, performing a negotiation procedure for exchanging the capabilities among the devices, a set-up of the compressed data type, the image area separation based on the image content, and adjusting the processing time "pf" and the display frame "f", it is also possible to enhance the image quality while utilizing the device capabilities.

Moreover, in a case that the generation time "pi" of the compressed data can be made approximately zero ("0"), with an invent such as the dihedral memory structure, an influential factor of the processing time "pf" becomes the data transfer time "pt". In this case, if the transfer rate of the data transfer device 211 has already defined, then the influential factor becomes an amount of data per screen (=processing time "pf"×transfer rate). That is, the compression rate becomes a large factor to determine the characteristics of the device as a whole. However, in the systems such as the JPEG, MPEG in which the compression rates vary with the patterns, the processing time can not be established in advance, and thus the device design becomes difficult. On the contrary, the processing time can be established in advance by adopting a compression system in which the compression rate is to be fixed by the parameter set-up, as in the present invention.

Figure 6:
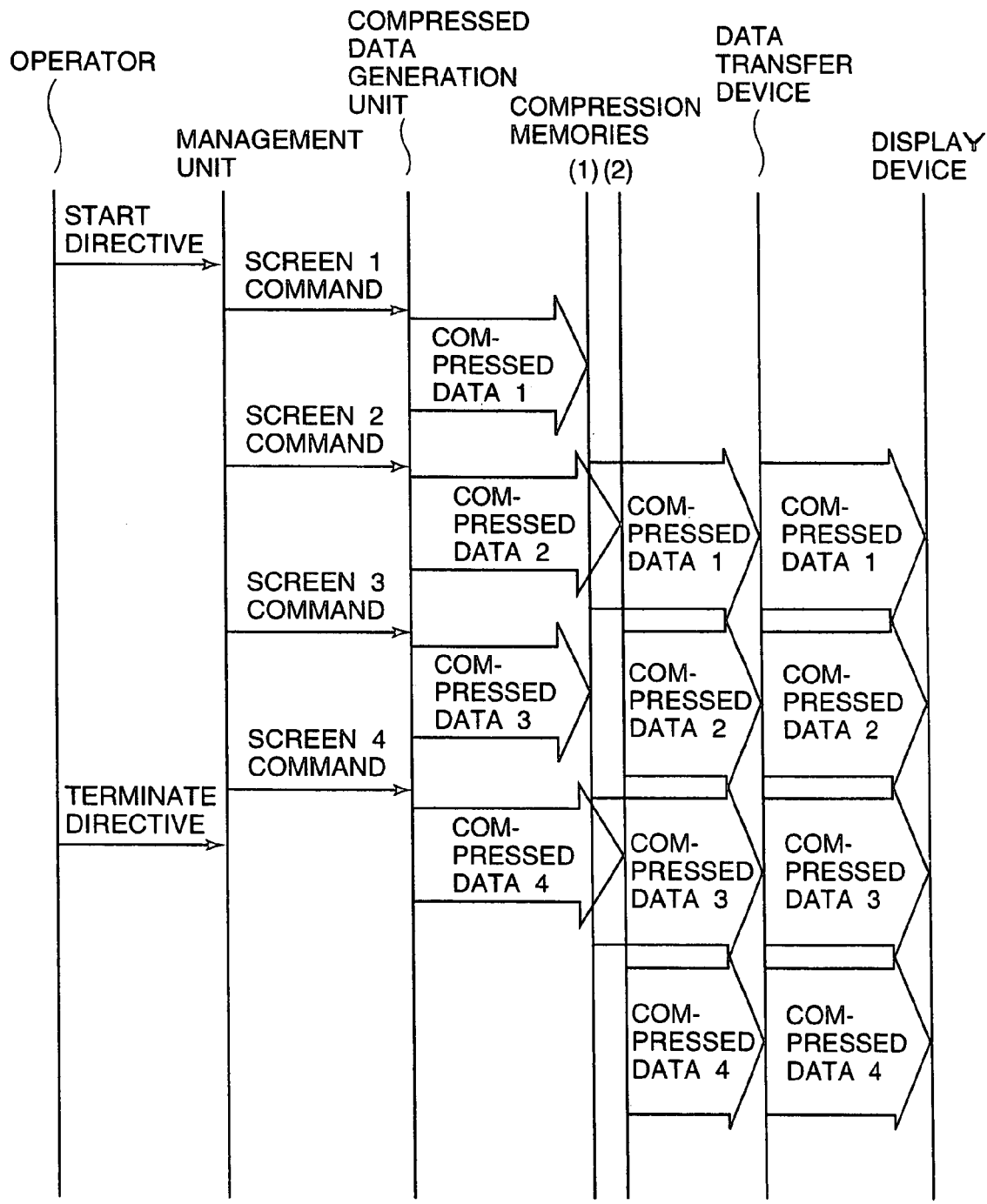
FIG. 6 is a diagram for illustrating a transfer method of a compressed data.

When transferring the compressed data, as shown in FIG. 6, the commands concerning the screen 1 to the screen 4 are inputted based on the start directive and the terminate directive of the operator, the compressed data 1 to 4 concerning the screen 1 to 4 are generated based on the commands inputted, and it makes possible to display the images that follow the respective commands onto the screen of the display device 212 by iterating the processes of transferring the compressed data 1 to 4 to the display device 212 through the data transfer device 211 after having stored the compressed data 1 to 4 into the compressed data memory 203. In this case, although the frame rate of the display is substantially controlled by the data transfer time, in order to shorten the transfer time, utilizing the compressed data may enhance the frame rate.

Further, when transferring the compressed data, the generation time "pi" of the compressed data as seeing from the data output side could-be made approximately zero "0" by constituting the compressed data memory 203 with the one having the capacity to store the compressed data for two screens, for example, two memories, as well as constituting the switches on both sides of each memory, and arranging them (the switches) to enable the processes of writing the data for one screen into one of the memories through one of the switches, and reading the data for one screen from the other memory through the other switch, and thereby alternately switching the memories which perform the reading of data and the writing of data.

Moreover, as other memory arrangement, for a block constituted of a plurality of pixels as a unit of a compression, for example, the processes of writing the data and of reading the data in the block unit could be performed simultaneously by arranging the memory in a dihedral structure. In addition, the compressed data memory 203 may be no longer required by arranging the generation of the compressed data to be faster than the data transfer rate.

Figure 7:
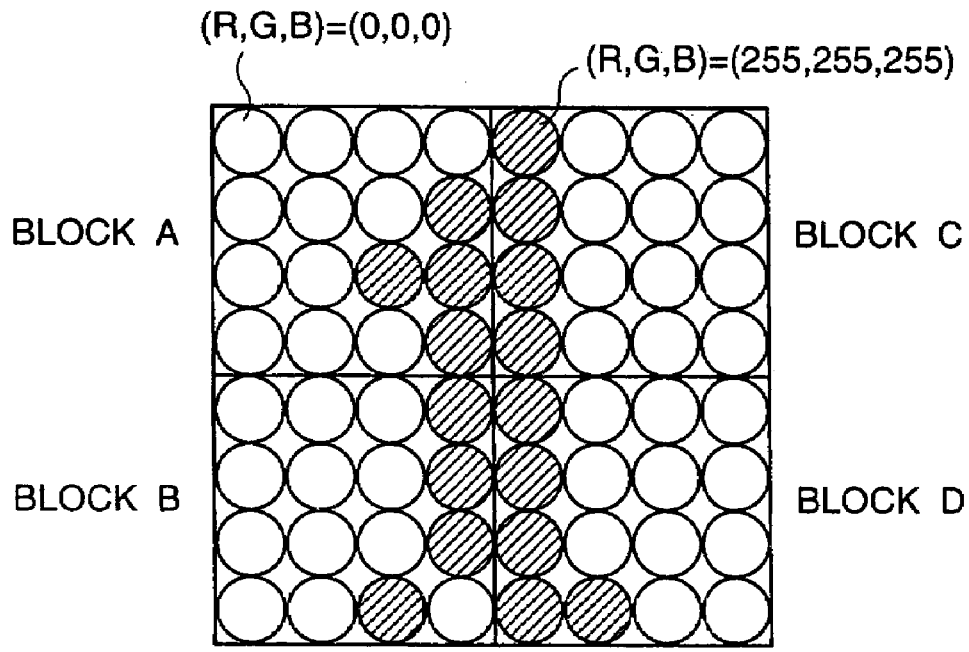
FIG. 7 is a diagram for illustrating a generation method of a compressed data.

In the following, a concrete generation method of a compressed data will be described. At a time when generating the compressed data, it is assumed that the inputted image is a two-dimensional image of which several pixels are arranged on a plane, the inputted image is divided into a block constituted of a plurality of pixels, and the compression processing procedures for a block unit is performed. In this case, a size of the block is not restricted, but it may be configured as 4 (four) in vertical and 4 (four) in horizontal (total 16 pixels/block), as shown in FIG. 7, for example. Further, a color signal of each pixel is not restricted, but here it is assumed to have the color signal of (Rij, Gij, Bij);. (i, j=0 to 3), and as an example of the compression procedure, it will be described for a case that as the kind of colors appeared within the block to be two kinds, the color signal within the block is approximated to two kinds.

(1) Measuring the amplitudes of the color signals (Rij, Gij, Bij), for all pixels (16 pixels) with the block A.

(2) Calculating the average value Cave, for the color signal C with the largest amplitude, within the block A. The color signal C may be any one of the RGB. Further, it may be varied for each block.

(3) Grouping all pixels within the block according to the large/small comparisons with the average value Cave of the color signal C. A number of pixels to be grouped into each group are not restricted.

(4) Calculating the average for two groups (R0, G0, B0), (R1, G1, B1). Then, representing the inside of the block A, by approximating with these two kinds of color signals.

(5) Approximating each pixel within the block A with either one of the two kinds of color signals (R0, G0, B0), (R1, G1, B1). As a result, a choice of two kinds of color signals is represented in 1 bit signal.

(6) Iterating the same processes from the above-mentioned (1), for the next blocks B to D.

According to the above-mentioned procedures, it may be represented by the two kinds of color signals (R0, G0, B0), (R1, G1, B1) for each block, and by a signal indicating the choice of two things for each pixel.

For example, when writing a black character onto a white background for each of the blocks A to D, as analogous color signals within each block, the white background (R, G, B)=(0, 0, 0), and the black (R, G, B)=(255, 255, 255) are set-up. Then for selecting each of the analogous color signals, a pixel of the white background is set-up to 1, and a pixel constituting the character is set-up to 0, respectively.

Here, in a case that the color signal is 8 bits, 1 (one) block of the inputted images becomes as 16 pixels×3 colors×8 bits=384 bits/block. On one hand, a compressed data generated by the above-mentioned procedures becomes as 3 colors×8 bits×two kinds×a signal indicating the choice of two things for each pixel 1 bit×16 pixels=64 bits. Comparing the two, it is apparent that the data is compressed to 1/6 of the original image data. As described above, in a step of the data generation, the process load may be reduced to 1/6. With the same ratio, the shortenings of the memory capacity and the memory writing time may be implemented. Further, this method has a feature that the compression rate is always a constant since the amount of data of the compressed data to be generated is not affected by the pattern within the block.

In the above-mentioned embodiment, the inside of block is represented by the two kinds (white and black) of analogous color signals, but it is not intended to limit the kind and the number thereof. Further, as he parameters of the compression processes, the block size, the kind of analogous colors within the block, the number of bits for the color signal and the like may be set-up.

A profile information becomes important for an area at where there is motion, and on the contrary, if it is not sensed as the number of bits of the color signal is reduced, then the amount of data may be reduced by representing a 8-bits signal with 6 bits, for example. In this case, it becomes the total of 52 bits as 36 bits (=two kinds×3 colors×6 bits) representing the two kinds of analogous color signals and the selection signal 16 bits (=16 pixels within the block) for each pixel, and the compression rate becomes 52/384 (=approximately 1/7.4).

The above-mentioned procedures implement the grouping (3) using the average value Cave calculated in the procedure (2), in order to simplify the processing. That is, each pixel is classified according to only a single color signal C. However, it is not limited to this classifying method, but the grouping may be made by performing a distance calculation on a color space.

The parameters such as the block size, the number of analogous colors within the block and the like may be modified arbitrarily in the above-mentioned procedures. The compression rate may be set-up along with this set-up of the parameters.

Figure 8:
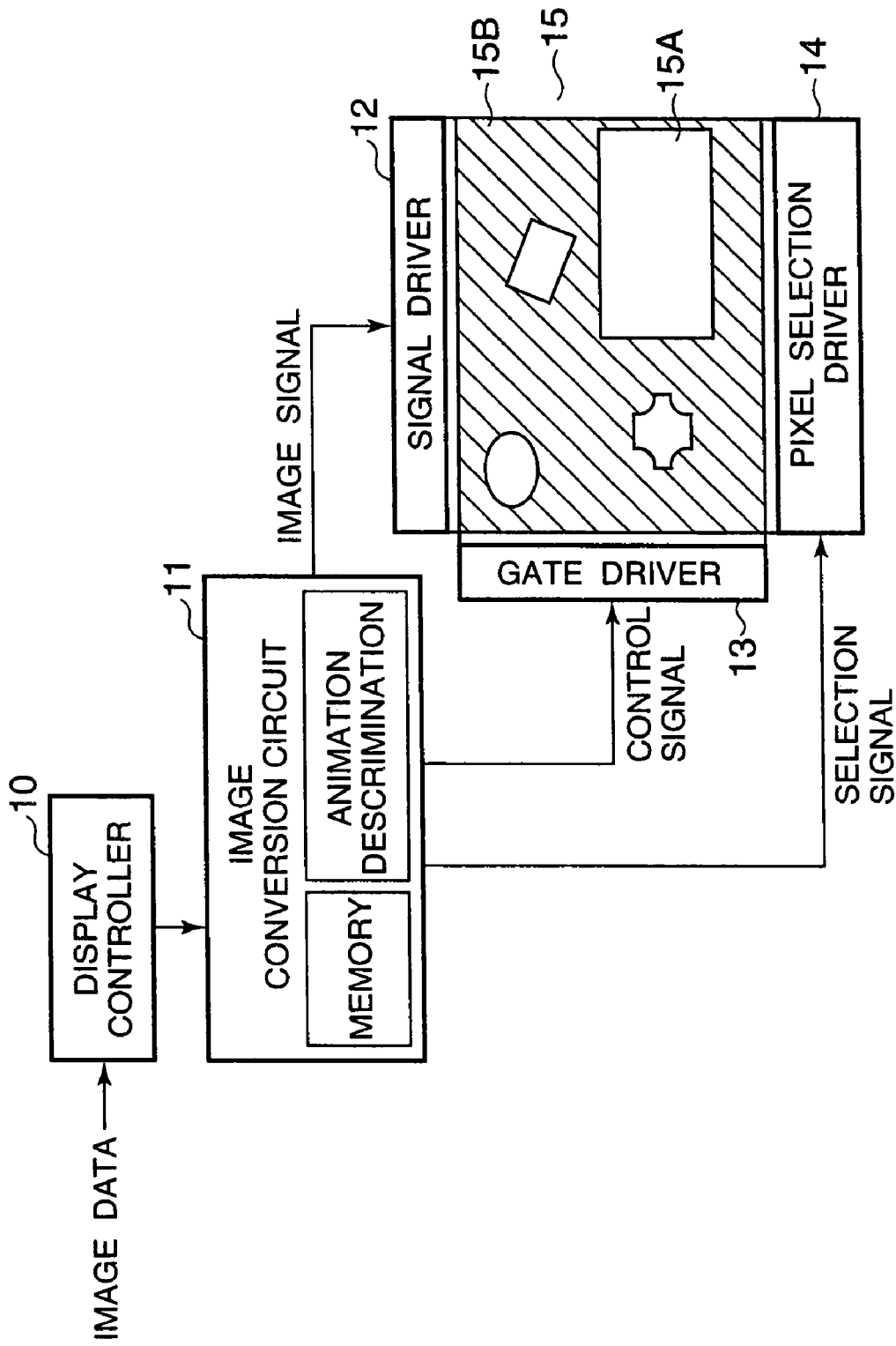
FIG. 8 is a block diagram showing an entire structure of a display device according to the present invention.

In the following, one embodiment of the image display device according to the present invention will be described in accordance with FIG. 8. FIG. 8 is a block diagram showing an entire structure of the image display device 212. The image display device 212 in the present embodiment is constituted of a display controller 10, an image conversion circuit 11, and a display panel 15. The display controller 10 converts the image data (compressed data) from the data transfer device 211 to a display data. The image conversion circuit 11 is constituted of a frame memory, which sends the data with different resolutions to the display panel 15, and an animation discriminate circuit.

On the periphery of the display panel 15, a signal driver 12 for applying an image data signal to the display panel 15, a gate driver 13 for applying a scanning signal to the display panel 15, and a pixel selection driver 14 for applying a selection signal which selects a display block are arranged.

The display panel 15 is capable of optionally switching an animation area 15A in which a plurality of pixels within one block is selected in one scanning period of time simultaneously and the same content is displayed, and a still-picture area 15B in which a plurality of pixels within 1 block are selected by multiple times of scanning and the different displays are possible for each selection, with a plurality of pixels among which several pixels are arranged in a matrix shape as 1 block unit.

In the image display device 212 of the present embodiment, for the plurality of pixels, it implements a smooth display of an animation by displaying the data with the low resolution in one scanning period of time simultaneously, and it also implements a highly minute display of a still-picture by displaying the data with high resolution in multiple times.

Although a detailed structure of the display panel 15 will be described later, the animation area 15A, in which input signals from the signal driver 12, the gate driver 13 and the pixel selection driver 14 are selected for a plurality of pixels within one block in one scanning period of time simultaneously and the same content is displayed, and the still-picture area 15B in which the input signals are selected by the scanning of multiple times, for the plurality of pixels within 1 block and the different displays are possible for each selection may be optionally selected, and the sizes and the display locations may be changed.

It makes also possible to switch the still-picture area 15B in FIG. 8 to the animation area 15A, and to switch the current animation area 15A to the still-picture 15B.

It may also adopt a system to divide the inside of block into two sub-blocks, for example, and to display the same information on each of the sub-blocks, for the still-picture which may be only with a relatively low minuteness, in matching with a minuteness of the still-picture to be displayed.

In the present specification, for a case of the color display, one pixel is constituted of 3 pixels of red, green and blue, and for a case of the monochrome display, it is assumed that one pixel is equal to one pixel.

Figure 9:
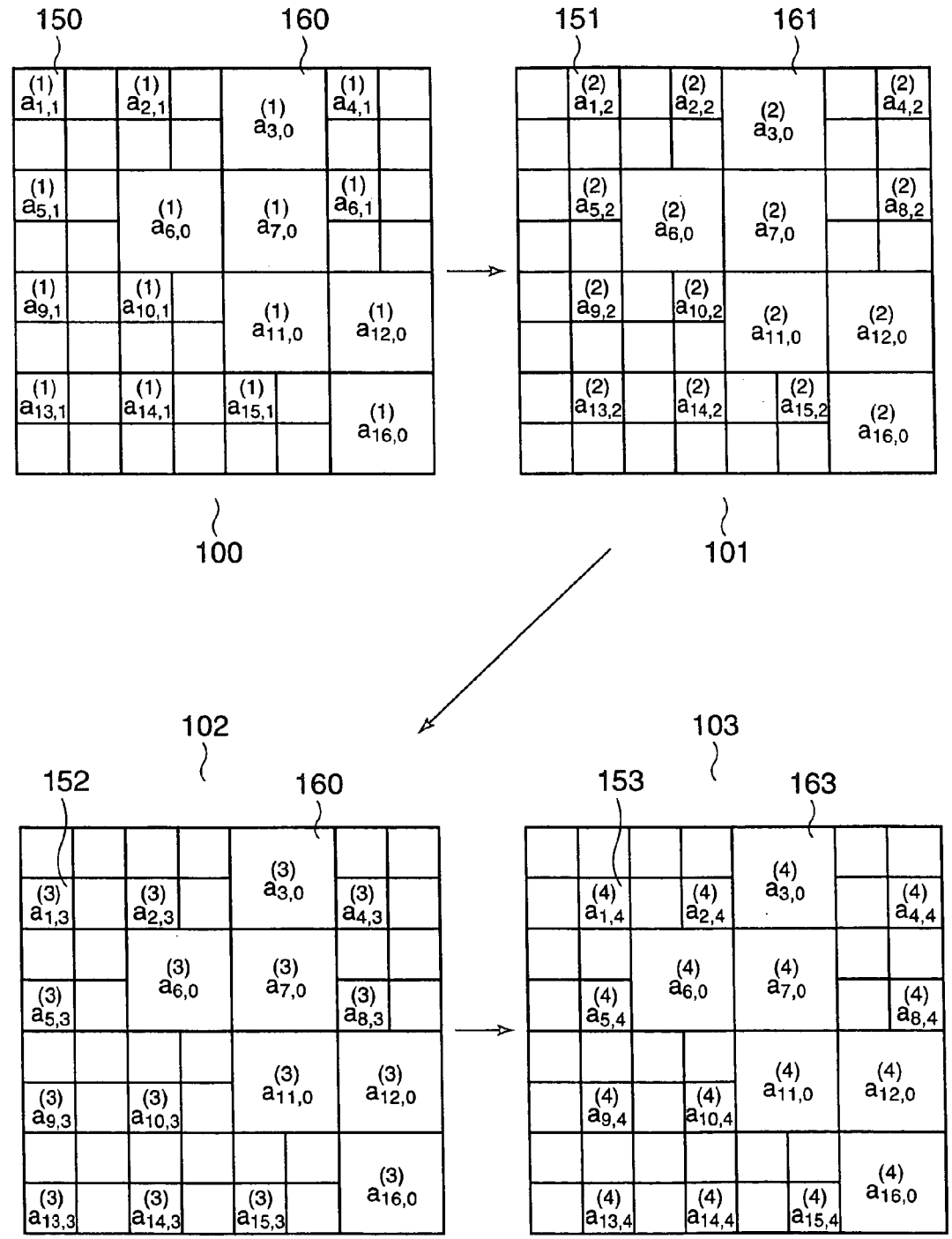
FIG. 9 is diagram enlargedly showing a portion of a display area in order to illustrate a write situation into a pixel for each frame in the embodiment shown in FIG. 8.

FIG. 9 is a diagram enlargedly showing a portion of the display area for illustrating a write situation into a pixel for each frame in the present embodiment. In the present embodiment, 4 pixels of 2×2 pixels are defined as 1 block unit.

First, in the first frame 100, the high minute still-picture area writes the image data $a^{(1)}_{1,1}$ into the pixel 150, and similarly, to other high minute still-picture areas, the image data is written into one pixel within four pixels, respectively.

On one hand, the low minute animation area writes the same image data $a^{(1)}_{3,0}$ into four pixels 160, and similarly, to other low minute animation areas, the same image data is written into four pixels, respectively.

In the second frame 101, the high minute still-picture area holds the image data $a^{(1)}_{1,1}$ of the pixel 150 written into the previous frame, and newly writes the image data $a^{(2)}_{1,2}$ into the pixel 151 which is different from the previous frame within the block, and similarly, to other high minute still-picture areas, the image data is written into one pixel that is different from the previous frame, respectively.

On one hand, the low minute animation area writes the same and the new image data $a^{(2)}_{3,0}$ into four pixels 161, and similarly, to other low minute animation areas, the same and new image data is written into four pixels, respectively.

In the third frame 102, the high minute still-picture area holds the image data of the pixels 150, 151 written into the first and second frames, and newly writes the image data $a^{(3)}_{1,3}$ into the pixel 152 which is different from the first and second frames within the block, and similarly, to other high minute still-picture areas, the image data is written into one pixel that is different from the first and second frames, respectively.

On one hand, the low minute animation area writes the same and the new image data $a^{(3)}_{3,0}$ into four pixels 162, and similarly, to other low minute animation areas, the same and new image data is-written into four pixels, respectively.

Further, in the fourth frame 103, the high minute still-picture area holds the image data of the pixels 150, 151, 152 written into the first, second and third frames, and newly writes the image data $a^{(4)}_{1,4}$ into the pixel 153 which is different from the first, second and third frames within the block, and similarly, to other high minute still-picture areas, the image data is written into one pixel that is different from the first, second and third frames, respectively.

On one hand, the low minute animation area writes the same and the new image data $a^{(4)}_{3,0}$ into four pixels 163, and similarly, to other low minute animation areas, the same and new image data is written into four pixels, respectively.

By iterating the above described processes, the high minute still-picture display area and the low minute animation display area can be displayed in arbitrary areas within the display area.

The high minute still-picture area forms a high minute image with four frames, and the low minute animation area can display a new data for each frame. Accordingly, the still-picture having no variation within four frames can be displayed in a high minute, and the animation with a rapid motion can be fast-displayed for each frame.

In the present specification, a display system for displaying by varying a resolution of an arbitrary area within a display area as described above is called as an image area separation display system.

Figure 10:
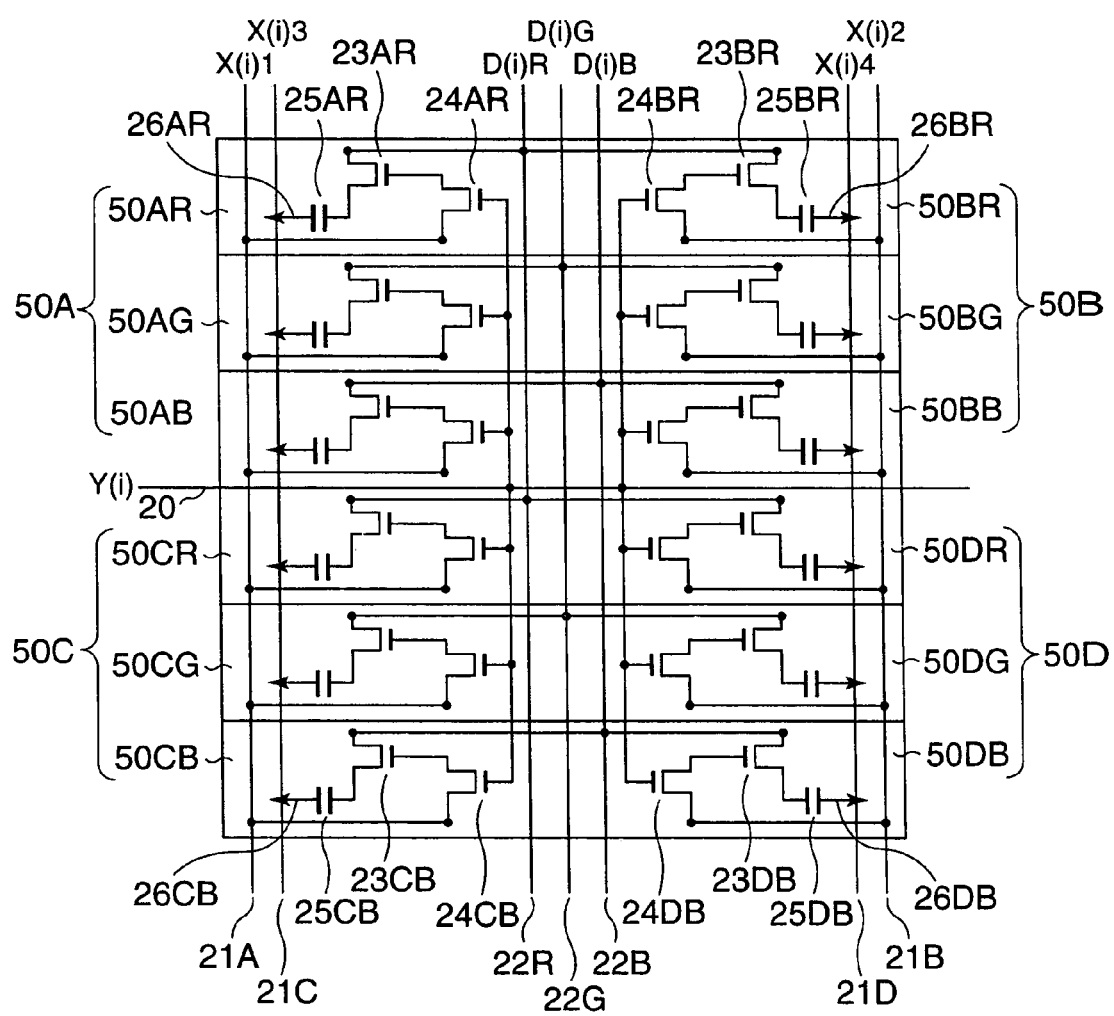
FIG. 10 is a circuit diagram showing an embodiment of a pixel circuit structure for implementing an image area separation display according to the present invention.

FIG. 10 is a circuit diagram showing an embodiment of a pixel circuit structure for implementing an image area separation display according to the present invention.

The present embodiment is a pixel circuit structure of which 2×2 pixels are made as 1 block unit, and an entire display area of the display panel 15 is formed by arranging a large number of this pixel circuit structures. One block unit is not restricted to four pixels. However, in considering a degradation of an opening ratio caused by an increase of wiring and the like, one block with four pixels is preferable.

The image display device using the image area separation display system of the present invention is not restricted to the liquid crystal display, and it is applicable to the ELD, FED, PDP and the like. Here, the present invention will be described with the liquid crystal display that is the most suitable as an example.

The liquid crystal display of the present embodiment is constituted of an illumination device on the background, and includes a pair of transparent substrates having polarizing plates and a liquid crystal layer sandwiched between these pair of transparent substrates, and is configured to control an orientation state of the liquid crystal layer by applying an electrical field to the liquid crystal layer, and to display an image.

In the circuit structure of 1 block pixel with four pixels in FIG. 10, for each elements, providing, after a number, A to an upper left pixel, B to an upper right pixel, C to a lower left pixel, and D to a lower right pixel, and further providing R, G, B for the pixels of Red, Green and Blue, correspondingly.

In the present embodiment, one block is formed by four pixels of the pixels 50A, 50B, 50C, 50D. The pixel 50A is constituted of three pixels of the Red 50AR, the Green 50AG, and the Blue 50AB. The pixel 50B is constituted of three pixels of the Red 50BR, the Green 50BG, and the Blue 50BB. The pixel 50C is constituted of three pixels of the Red 50CR, the Green 50CG, and the Blue 50CB. The pixel 50D is constituted of three pixels of the Red 50DR, the Green 50DG, and the Blue 50DB.

A scanning wiring 20 that is a common to the four pixels is formed at a center, and twelve gates of the thin film transistors 24AR, 24BR, 24CB, 24DB and the like that are the first switches are connected to the scanning wiring 20.

A block selection signal wiring 21A is connected to the drain electrodes of the thin film transistors 24AR, 24AG, and 24AB that are the first switches. A block selection signal wiring 21B is connected to the drain electrodes of the thin film transistors 24BR, 24BG, and 24BB. A block selection signal wiring 21C is connected to the drain electrodes of the thin film transistors 24CR, 24CG, and 24CB. A block selection signal wiring 21D is connected to the drain electrodes of the thin film transistors 24DR, 24DG, and 24DB.

The thin film transistors 24AR, 24AG, 24AB that are the first switches are the switches for selecting the pixel 50A, respectively, and can also be formed as one by a commonization. Similarly to the pixels 50B, 50C, 50D, the first switches can also be formed as one by a commonization.

Twelve gate electrodes of the thin film transistors 23AR, 23BR, 23CB, 23CB and the like that are the second switches are connected to the source electrodes of the thin film transistors that are the first switches.

A red color image signal wiring 22R, a green color image signal wiring 22G, and a blue color image signal wiring 22B are connected to the drain electrodes of the thin film transistors that are the second switches, respectively.

To the source electrodes of the thin film transistors that are the second switches, the pixel electrodes are connected, respectively, and the counter electrodes 26AR, 26BR, 26CB, 26DB and the like are connected thereto, by sandwiching the liquid crystal layer, so that they form the pixel units 25AR, 25BR, 25CB, 25DB and the like.

The counter electrodes are the electrodes that are common to all pixels. To the pixel units 25AR, 25BR, 25CB, 25DB and the like, the holding capacitors are formed in parallel.

By adopting the image circuit structure such as described above, it makes possible the image area separation display illustrated in FIG. 9.

In the present embodiment, in FIG. 10, although the scanning wiring 20 is connected to the gates of the first switches and the block selection signal wiring is connected to the drain electrodes of the first switches, but it may be arranged as a structure of which the block signal selection wiring for each pixel is connected to the respective gates, and the scanning wiring 20 is connected to the drain electrodes of all four pixels.

Figure 11:
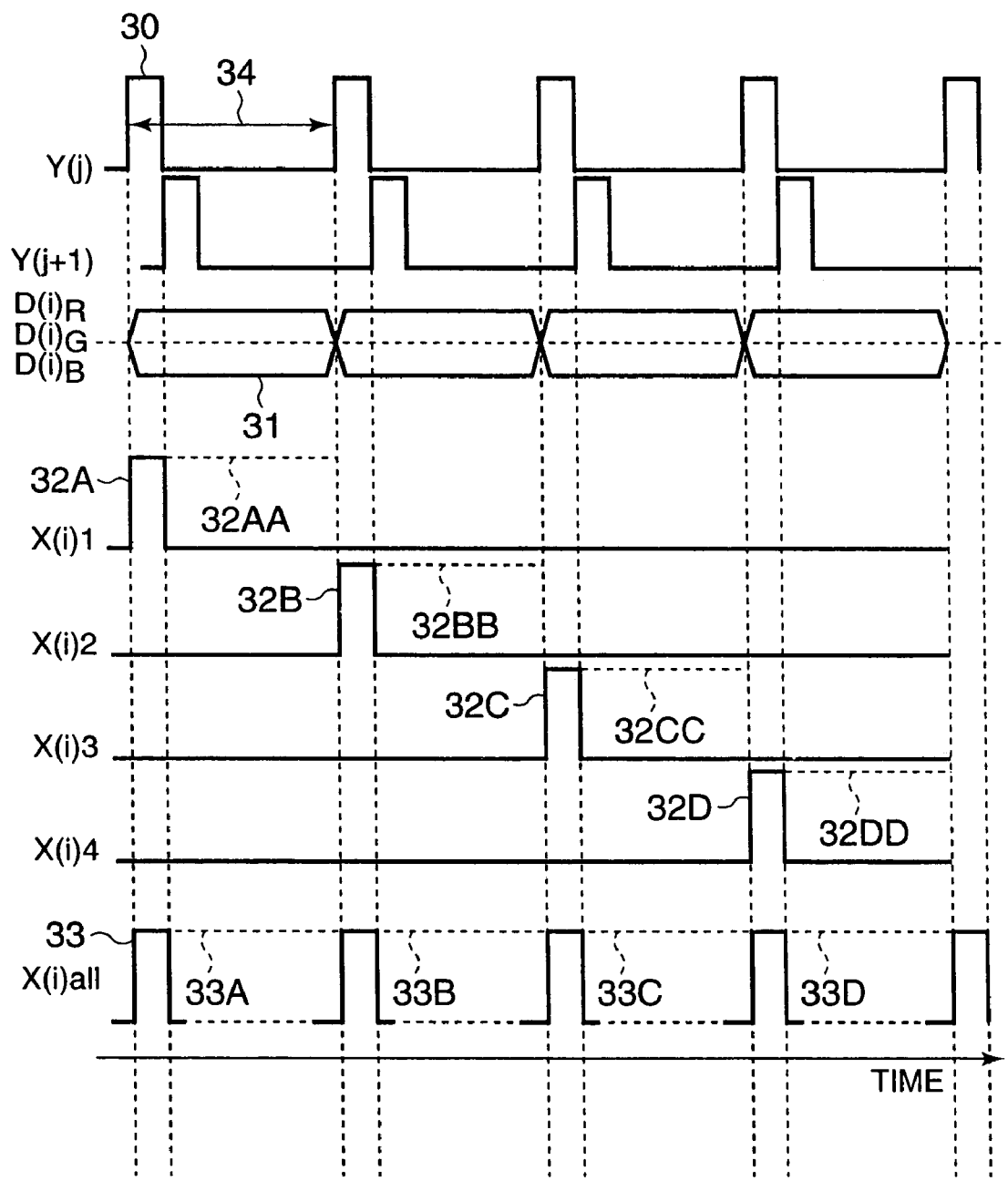
FIG. 11 is a timing chart showing an example of a driving voltage waveform to be applied to each wire, in order to perform the image area separation display according to the present invention.

FIG. 11 is a timing-chart showing an example of a driving voltage waveform to be applied to each wiring in FIG. 10 in order to perform an image area separation display. Consider the j-th scanning wiring Y(j). To the scanning wire Y(j), a gate voltage 30 which turns on the thin film transistors that are first switches for every frame period of time 34 is applied. In synchronization with this gate voltage 30, in the area for performing a high minute display, the voltages 32A to 32D are applied to the block selection signal wiring X(i)$_1$ to X(i)$_4$ 21A to 21D for each 4 blocks, respectively, and in synchronization with the gate voltage 30, the image signals 31 corresponding to the red color D(i)R, the green color D(i)G, and the blue color D(i)B are applied to the pixels through the second switches.

Accordingly, only either one of the pixels 50A, 50B, 50C and 50D is selected. Further, in the pixels not to be selected, the voltages are held, during four (4) frames.

On one hand, in the area for performing a low minute display, the voltage 33 is applied to 21A to 21D that are the block selection signal wiring X(i)$_{all}$ for each frame, respectively, and in synchronization with the gate voltage 30, the image signals 31 corresponding to the red color D(i)R, the green D(i)G, and the blue color D(i)B are applied to the pixels through the second switches. Accordingly, the same signal is applied to all of the pixels 50A, 50B, 50C, 50D, and thus the same display for four pixels can be rewritten for each frame.

For the j+1-th scanning wiring Y(j+1), similarly to the j-th wiring, it discriminates whether it is the high minute display area or the low minute display area, and by inputting the above-mentioned driving waveform, it makes possible a display of an image area separation.

Consequently, by displaying a still-picture in the high minute area and an animation in the low minute area, even in the display mixed of the animation and the still-picture, the animation can be rewritten in fast-speed, and the still-picture is displayed in the high minute.

Figure 12:
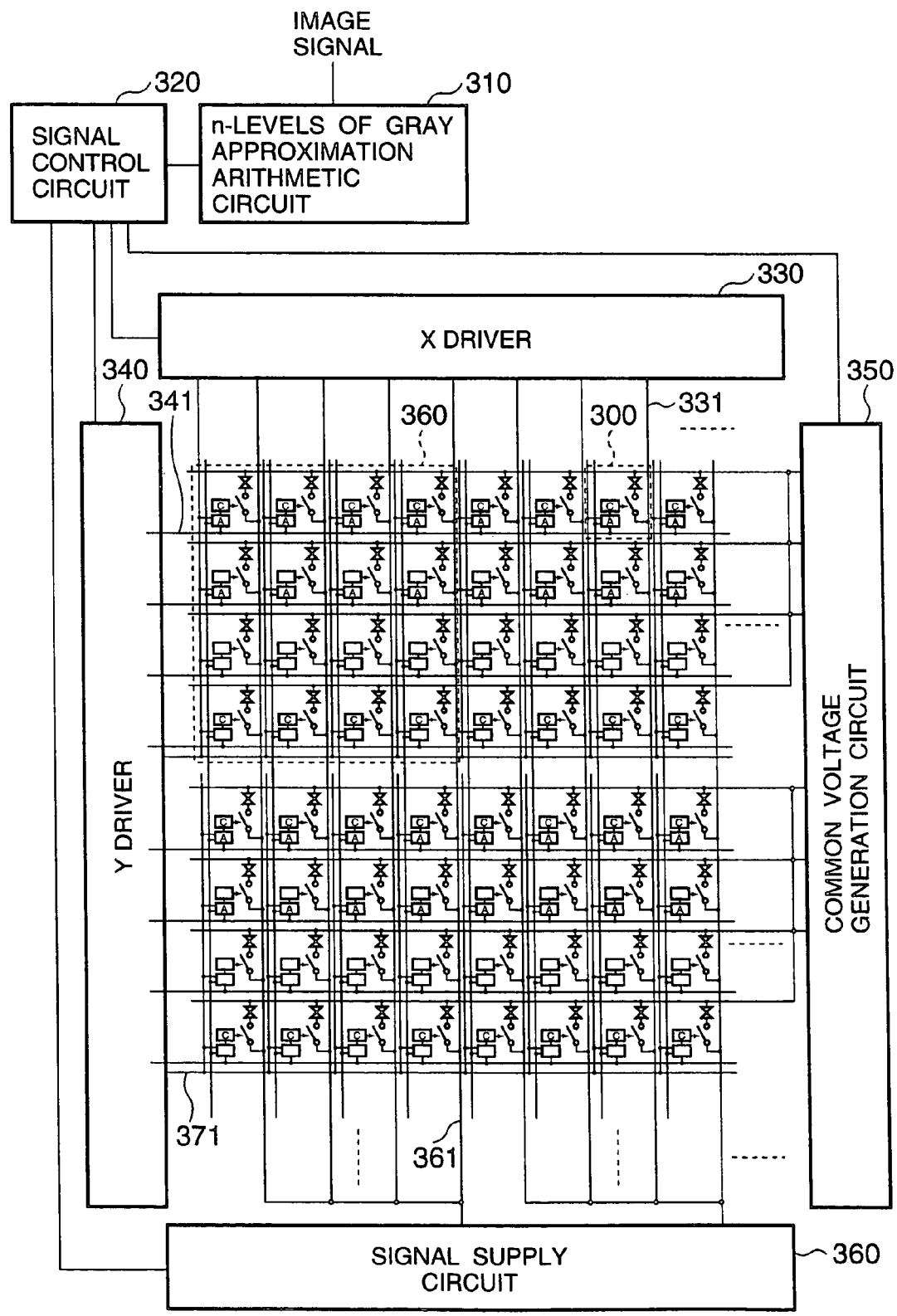
FIG. 12 is a block diagram showing an entire structure of a display device according to another embodiment of the present invention.

In the following, another embodiment of the display device 212 according to the present invention will be described with reference to FIG. 12. FIG. 12 is a block diagram showing an entire structure of the display device 212 according to the present invention. The display device 212 in the present embodiment is constituted of n-levels of gray approximation arithmetic circuit 310 for converting the inputted image signal to a n-levels of gray approximate image signal approximated to a gray level of a binary value for each block, a signal control circuit 320 for supplying predetermined signals to the X driver 330, the Y driver 340, the common voltage generation circuit 350, and the signal supply circuit 360 in accordance with the n-levels of gray approximation image signals outputted from the n-levels of gray approximation arithmetic circuit 310, and a plurality of pixel units 300 provided at an intersection unit of a X signal line 331 connected to the X driver 330 and extended to the Y direction and a Y signal line 341 connected to the Y driver 340 and extended to the X direction.

Figure 13:
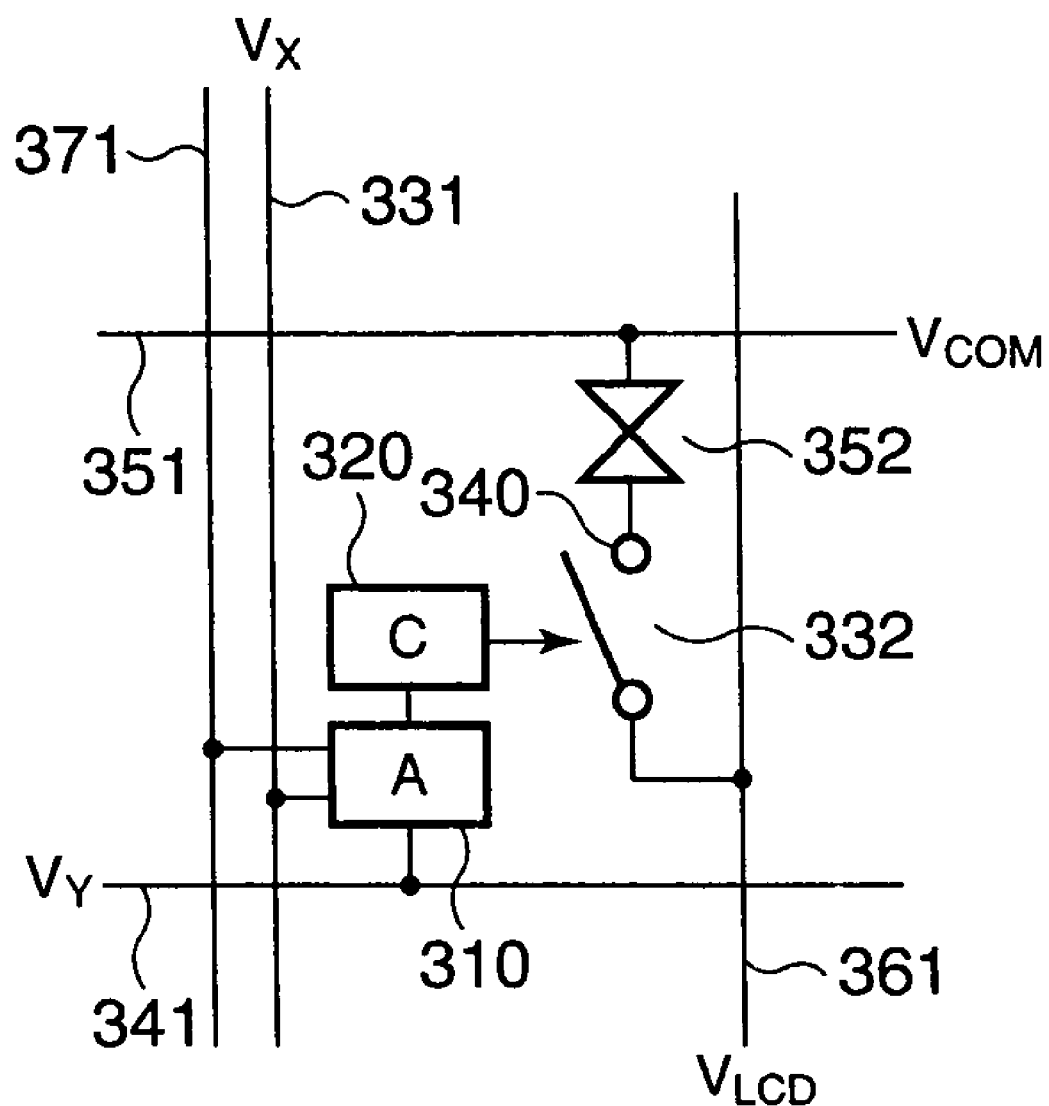
FIG. 13 is a circuit diagram showing an example of the pixel unit 300 shown in FIG. 12.

FIG. 13 is a circuit diagram showing an example of a structure of the pixel unit 300. To the pixel unit 300, the X signal $V_X$ is supplied from the X driver 330 through the X signal line 331. To the pixel unit 300, the Y signal $V_Y$ is supplied from the Y driver 340 through the Y signal line 341. To the pixel unit 300, the liquid crystal driving signal $V_{LCD}$ is supplied from the signal supply circuit 360 through the liquid crystal driving signal line 361. In addition, to the pixel unit 300, the common voltage $V_{COM}$ is supplied from the common voltage generation circuit 350 through the common voltage line 351.

The pixel unit 300 is constituted of a XY arithmetic circuit 310 connected to both the X signal line 331 and the Y signal line 341, a signal comparator 320 connected to the XY arithmetic circuit 310, a switch 332 which is controlled in response to an output of the signal comparator 320, a pixel electrode 340 of which a connection to the liquid crystal driving signal line 361 is controlled by the switch 332, and a liquid crystal 352 arranged between the pixel electrode 340 and the common voltage line 351. As shown in FIG. 12, the pixel unit 300 is divided into the block 360 that consists of the total of 16 pixel units of 4 columns in the X direction and 4 rows in the Y direction.

Figure 14:
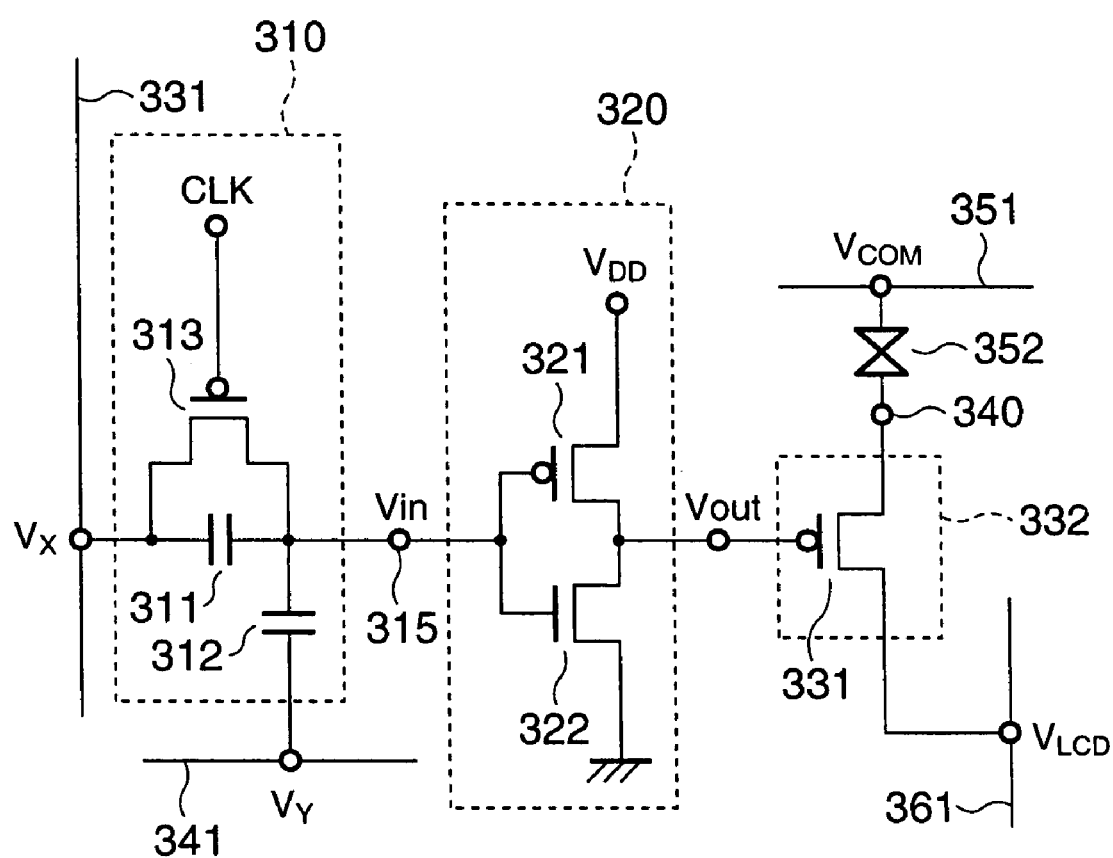
FIG. 14 is a circuit diagram showing an example of a detailed circuit structure of the pixel unit 300 shown in FIG. 12.

FIG. 14 is a circuit diagram showing an example of a detailed circuit structure of the pixel unit 300. The XY arithmetic circuit 310 is constituted of a capacitor 111 connected to a terminal to which the $V_X$ is supplied from the X signal line 331, a capacitor 312 connected to a terminal to which the $V_Y$ is supplied from the Y signal line 341, and a p-type MOS-TFT 313 which operates in response to a clock signal CLK.

The clock signal CLK is supplied from the Y driver 340 through a clock signal line 371. The signal comparator 320 is constituted of a p-type MOS-TFT 321 and an n-type MOS-TFT 322, which are connected in series. The switch 332 is a p-type MOS-TFT 331. A source terminal of the p-type MOS-TFT 331 is connected to the pixel electrode 340, and a drain terminal thereof is connected to the liquid crystal driving signal line 361.

The capacitance of the capacitor 311 and the capacitance of the capacitor 312 of the XY arithmetic circuit 310 are equivalent, and an input voltage $V_{in}=(V_X+V_Y)/2$ of the signal comparator is outputted therefrom. Since an output terminal 315 of the XY arithmetic circuit 310, i.e., the input terminal of the signal comparator 320 is floating, it is operated stably by occasionally conducting the output terminal 315 and the X signal line 331, through the p-type MOS-TFT 313.

FIG. 15 is a diagram for illustrating an operation of the signal comparator 320. A relationship of the input Vin and the output Vout of the signal comparator 320, at a time when the $V_{DD}$ is set to 12 V is, as shown in FIG. 15, Vout=12 V if the Vin is equal to or less than 4 V, and Vout=0 V if the Vin is equal to or more than 6 V. Further, in FIGS. 12 and 13, for simplifying a description, a signal line for supplying the $V_{DD}$ and a signal line for supplying a grounded voltage are omitted.

In the following, an operation of the present embodiment will be described. To the n-levels of gray approximation arithmetic circuit 310, an image signal having a gray level information for each pixel is inputted. In the n-levels of gray approximation arithmetic circuit 310, the pixel is divided into the blocks of 4 rows×4 columns=16, and a gray level of a pixel is approximated to a binary value for each block.

This approximation is performed as follows. First, calculating an average value of the gray levels of the 16 pixels. Classifying the pixels within the block into the pixels H having the higher gray levels than the average value and the pixels L having the lower gray levels than the average value. Calculating an average value of the gray levels of the pixels H, and approximate this as the gray level value of the pixels H. Similarly, calculating an average value of the gray levels of the pixels L, and approximate this as the gray level value of the pixels L. Further, checking the pixels within the block in the Y direction, and for example, if they are arranged as the pixel H, the pixel H, the pixel L, the pixel H in order, it should be rearranged as the pixel H, the pixel H, the pixel H, the pixel L, and should be approximated as to be two areas of the pixel H and the pixel L, or only the pixels H, or only the pixels L along the Y direction. In this case, two gray level values are defined as the first gray level value and the second gray level value in order in the Y direction. Then, performing the above-mentioned approximation for all blocks, and generating the n-levels of gray approximation image signals, and inputting these into the signal generation circuit 320. The signal generation circuit 320 generates signals for controlling the outputs of the X driver, the Y driver, the signal supply circuit, and the common voltage generation circuit in response to the n-level gray approximation image signal.

FIG. 16 is a diagram for illustrating a control operation of the display device 312 in FIG. 12. FIG. 16 is drawn by extracting the total of 64 pixels of 8 columns in the X direction and 8 rows in the Y direction. 4 rows×4 columns=16 pixels is set to be 1 block. It is defined as the first column, the second column, . . . from the toward the X direction on the screen. It is defined as the first row, the second row, . . . from the upper part toward the Y direction on the screen.

First, for the selection period of time t1, the $V_{YMAX}=20$ V is applied to the signal lines of the first row to the fourth row, and the $V_{YMIN}=0$ V is applied to other Y signal lines. In each square of FIG. 16, an output voltage (Vin) of the XY arithmetic circuit for that pixel is written. As described above, $Vin=(V_X+V_Y)/2$. In the example of FIG. 16, the $V_X=4$ V is applied to the first column and the $V_Y=20$ V is applied to the first row, and thus Vin=(4+20)/2=12 V. A voltage applied to as the $V_X$ is either one of −8, −4, 0, 4, and 8 V, and if the $V_Y=V_{YMAX}=20$ V, the Vin is absolutely equal to or more than 6 V. Since the signal comparator 320 has the characteristics shown in FIG. 15, the Vout in this case is 0 (zero), regardless of the $V_X$. Accordingly, the p-type MOS-TFT331 of the switch 332 is in continuity, and the liquid crystal driving voltage $V_{LCD}$ is written into the pixel electrode 340.

That is, the $V_{LCD}$ corresponding to the first gray level value is written into the pixel electrodes of all pixels of the first row to the fourth row during the period time of t1. Here, the $V_{LCD}$ of the same block are the same, but the $V_{LCD}$ of the other blocks have the different voltage values. That is, the first gray level value is different for each block.

On one hand, since the $V_Y$ of the fifth row to the eighth row are the $V_{YMIN}=0$ V, and thus the value of Vin becomes equal to or less than 4 V, regardless the value of $V_X$. Since the signal comparator 320 has the characteristics shown in FIG. 15, the Vout in this case is 12 V, regardless the $V_x$. Accordingly, the p-type MOS-TFT 331 of the switch 130 is in non-continuity, and thus the voltage of the pixel electrode 340 is held without being varied.

For the selection period of time t2, the $V_Y$ in the first block group become 4, 8, 12 and 16 V from the top in order, and the $V_Y$ in the second block group becomes the $V_{YMAX}=20$ V. Although it is not shown in FIG. 16, the $V_Y$ in other rows are all $V_{YMIN}=0$ V. To the X signal line 331, a voltage is applied to in response to the n-levels gray approximation signal.

That is, the $V_X=4$ V is applied to the columns in which the pixels in the first row is the first gray level value, and the pixels in the second to the fourth rows are the second gray level value. The $V_X=0$ V is applied to the columns in which the pixels in the first to second rows are the first gray level value, and the pixels in the third to the fourth rows are the second gray level value. The $V_X=-4$ V is applied to the columns in which the pixels in the first to third rows are the first gray level value, and the pixels in the fourth row are the second gray level value. The $V_X=-8$ V is applied to the columns in which all pixels in the first to fourth rows are the first gray level value. The $V_X=8$ V is applied to the columns in which all pixels in the first to fourth rows are the second gray level value.

The first column of FIG. 16(b) is a case that the n-level of gray approximation signal in which the pixels in the first to second rows are the first gray level value, and the pixels in the third to fourth rows are the second gray level value is being transmitted, and the $V_X$ of the first column becomes 0 V in response thereto. The squares shown in hatching are the pixels of which the liquid crystal driving voltages are written into the pixel electrodes during this period of time. In the present embodiment, the second gray level values of the blocks corresponding to the first to the fourth rows are the same value as the first gray level values of the blocks corresponding to the fifth to eighth rows.

As described above, at first, writing the liquid crystal driving voltage corresponding to the first gray level into the pixel electrodes of all blocks corresponding to the first to fourth rows during the first period of time. Then during the second period of time that follows, by rewriting only the pixel electrodes of the pixels that become the second gray level value, with the liquid crystal driving voltage corresponding to the second gray level value, it makes possible to write the liquid crystal driving voltage corresponding to the n-levels of gray approximation image signal generated by the n-levels of gray approximation signal arithmetic circuit into the pixel electrodes of the pixels within the blocks.

While the liquid crystal driving voltages are being written into the blocks of other rows, the p-type MOS-TFT of the switch is in the non-continuity, so that the written liquid crystal driving voltage are held until those blocks are selected again. By iterating the above-mentioned operations sequentially, the liquid crystal driving voltages corresponding to the n-levels of gray approximation signal are written into the pixel electrodes of all blocks.

Figure 17:
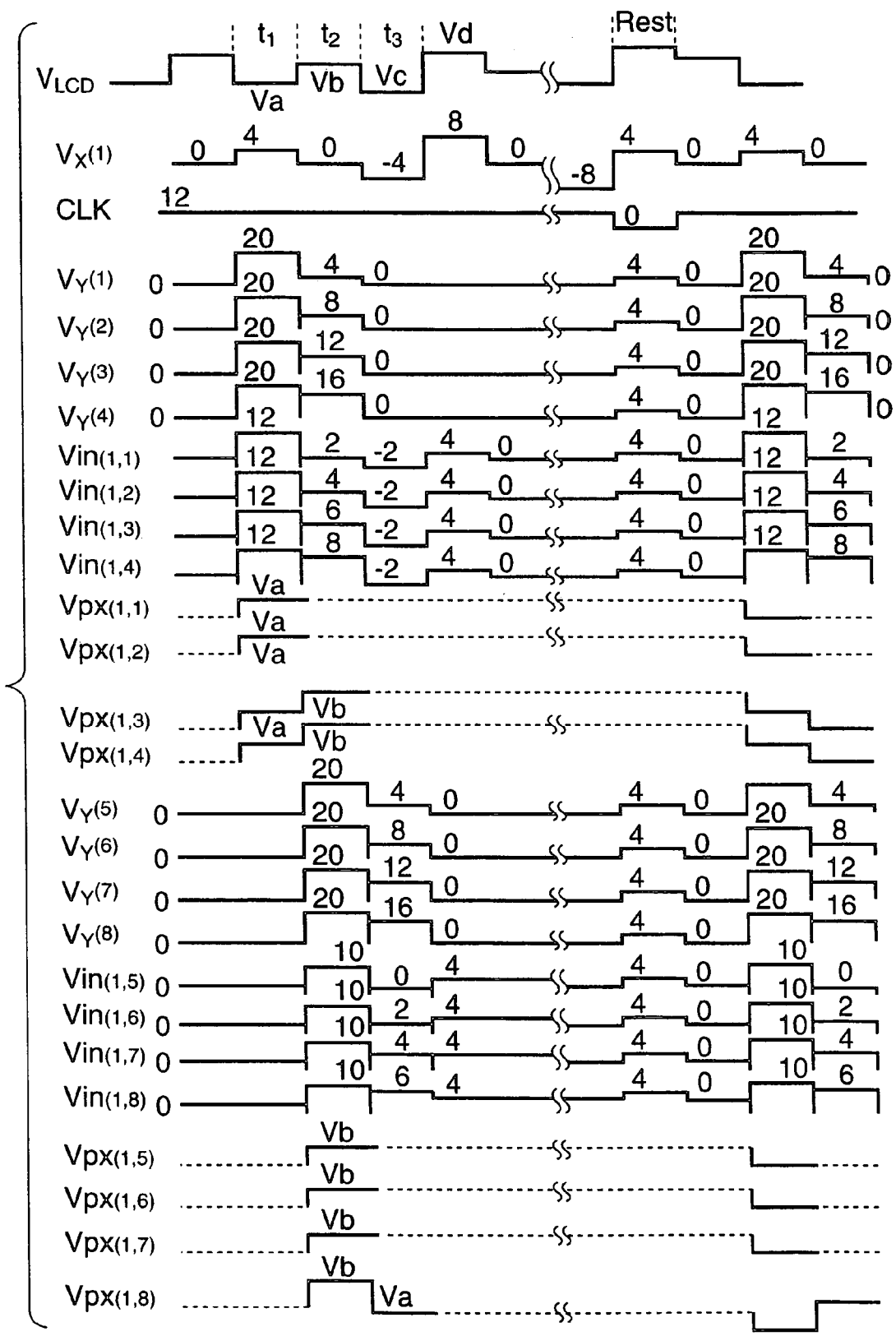
FIG. 17 is a timing chart for illustrating a control operation of the display device shown in FIG. 12.

FIG. 17 is a timing-chart showing a control operation of the display device shown in FIG. 12. The $V_{LCD}$ is a liquid crystal driving voltage common to the blocks corresponding to the first to fourth rows. The CLK is a clock signal of the XY arithmetic circuit. The $V_Y(1)$ to $V_Y(8)$ are the voltages VY of the Y signal line 41 from the first row to the eighth row, respectively. The Vin (1, 1) to Vin (1, 8) are the input voltages Vin of the signal comparator 320 from the pixels of the first column, the first row to the pixels of first column, the eighth row, respectively. The Vpx (1, 1) to Vpx (1, 8) are the voltages of the pixel electrodes 340 from the pixels of the first column, the first row to the pixels of first column, the eighth row, respectively. In the Vpx (1, 1) to Vpx (1, 8), the dotted lined part indicates that the p-type MOS-TFT 331 is in non-continuity, and the state of the voltages of the pixel electrodes being held.

During the selection period of time t1, the $V_{LCD}$=Va, $V_x$ (1)=4 V, and CLK=12 V. Since the $V_Y(1)$ to $V_Y(4)$=$V_{MAX}$=20 V, then Vin (1, 1) to Vin (1, 4)=(4+20)/2=12 V, and all are equal to or more than 6 V, so the p-type MOS-TFT 331 becomes in continuity, and to the pixel electrode 340, the liquid crystal driving voltage $V_{LCD}$=Va is written, and the Vpx (1, 1)=Vpx (1, 2)=Vpx (1, 3)=Vpx (1, 4)=Va. Since the $V_Y(5)$ to $V_Y(8)$=$V_{YMIN}$=0 V, then Vin (1, 5) to Vin (1, 8)=(4+0)/2=2 V, and all are equal to or less than 4 V, so the p-type MOS-TFT 331 becomes in non-continuity, and the electrical potentials Vpx (1, 5) to Vpx (1, 8) of the pixel electrode 340 are held without being varied.

During the selection period of time t2 that follows, the $V_{LCD}$=Vb, $V_x$ (1)=0 V, and CLK=12 V. Since the $V_Y(1)$=4 V, $V_Y(2)$=8 V, $V_Y(3)$=12 V and $V_Y(4)$=16 V, then from the Vin=$(V_X+V_Y)/2$, Vin (1, 1)=2 V, Vin (1, 2)=4 V, Vin (1, 3)=6 V, and Vin (1, 4)=8 V. The p-type MOS-TFT 331 of the pixels of which the Vin equal to or more than 6 V becomes in continuity, and since to the pixel electrode 340, the liquid crystal driving voltage $V_{LCD}$=Vb is written, so that the Vpx (1, 3)=Vpx (1, 4)=Vb.

The p-type MOS-TFT 331 of the pixel of which the Vin is equal to or less than 4 V becomes in non-continuity, and since the liquid crystal driving voltage Va written during the period t1 is held in the pixel electrode 340, it would be the Vpx (1, 1)=Vpx (1, 2)=Va. Since the $V_Y(5)$ to $V_Y(8)$=$V_{YMAX}$=20 V, then Vin (1, 5) to Vin (1, 8)=(0+20)/2=10 V, and all are equal to or more than 6 V, so the p-type MOS-TFT 331 becomes in continuity, and to the pixel electrode 340, the liquid crystal driving voltage $V_{LCD}$=Vb is written, and the Vpx (1, 5)=Vpx (1, 6)=Vpx (1, 7)=Vpx (1, 8)=Vb.

During the selection period of time t3 that follows, the $V_{LCD}$=Vc, $V_x$ (1)=−4 V, and CLK=12 V. Since the $V_Y(1)$=$V_Y(2)$=$V_Y(3)$=$V_Y(4)$=$V_{YMIN}$=0V, then from the Vin=$(V_X+V_Y)/2$, Vin (1, 1)=Vin (1, 2)=Vin (1, 3)=Vin (1, 4)=−2 V. Since the Vin is equal to or less than the 4 V, the p-type MOS-TFT 331 of the pixels becomes in non-continuity, and the voltage of the pixel electrode 340 is held, so that the Vpx (1, 1)=Vpx (1, 2)=Va, and the Vpx (1, 3)=Vpx (1, 4)=Vb. Since the $V_Y(5)$=4 V, $V_Y(6)$=8 V, $V_Y(7)$=12 V, $V_Y(8)$=16 V, then from the Vin=$(V_X+V_Y)/2$, Vin (1, 5)= 0 V, Vin (1, 6)=2 V, Vin (1, 7)=4V, and Vin (1, 8)=6 V.

The p-type MOS-TFT 331 of the pixel of which the Vin is equal to or more than 6 V becomes in continuity, and since the liquid crystal driving voltage $V_{LCD}$=Vb is written into the pixel electrode 340, it would be the Vpx (1, 8)=Vc. The p-type MOS-TFT 331 of the pixels of which the Vin is equal to or less than 4 V becomes in non-continuity, and to the pixel electrode 340, the liquid crystal driving voltage Vb which is written during the period of time t2 is held, so that the Vpx (1, 5)=Vpx (1, 6)=Vpx (1, 7)=Vpx (1, 8)=Vb.

By iterating the above described processes, sequentially writing the liquid crystal driving voltages $V_{LCD}$ corresponding to the n-levels of gray approximation image signal generated in the n-levels of gray approximation arithmetic circuit 310 to the pixel electrodes 340 of the pixels in the blocks of the ninth row to twelfth row, and from the thirteen row to the sixteenth row.

After having completed the writing of all pixel electrodes, providing the Reset period of time, and resetting the output terminals of the XY arithmetic circuit during this period of time, and so as to operate stably. During the Reset period of time, for all of $V_X$=$V_Y$=4 V, and CLK=0 V. At this moment, the p-type MOS-TFT 313 becomes in continuity, and the voltage of the output terminal becomes the voltage 4V that is equal to the $V_X$ and $V_Y$. By providing such mechanism, even if the unwanted charges are stored at the output terminal that is floating, as caused by something, it can be cancelled and thus the stable operation may be obtained.

By completing the above mentioned operation within 1 frame period of time, iterating this frame period of time, and then displaying the image.

As described above, it makes possible to write the liquid crystal driving voltages into the pixel electrodes of the pixels in 1 block constituted of four rows with twice of the selection period of time, and comparing to the case of writing four rows with four times of the selection period of time, the number of times of the period of time becomes a half.

If 1 frame period of time is the same, using the present embodiment, the length of the period of time can be made twice as much. Further, in the case of the present embodiment, since the second selection of period of time and the next first selection of period of time of the block constituted of 4 rows are the same, the selection time of period become twice as much, and thus the period of time of total four times can be secured.

As described above, according to the image display system of the present embodiment, at a time when transferring the compressed data generated by the display control device 200 to the display device 212 through the data transfer device 211, by varying the compression rate of the data in matching with the frame rate, an increase of the load of the data transfer can be suppressed, for an increase of the amount of data. More concretely, by enlarging the data compression rate in matching with an increase of the frame rate, the contrast conditions of the number of pixels and the frame rate can be eased.

Incidentally, at a time when transferring the compressed data generated by the display control device 200 to the display device 212 through the data transfer device 211, it is necessary to consider the followings.

That is, in the display device 212, there are fixed characteristics attached to the device such as the screen size, the number of pixels, the colors (fluorescence, color filter, etc.) and the like, and variable characteristics represented by the upper limit and the lower limit such as the frame rate of the display device itself. Here, the frame rate to be displayed in practice is set up in synchronization with the display data to be inputted, and in general, flickering would be less as the frame rate becomes higher, and thus it contributes to an enhancement of an image quality.

On one hand, as the device capability of the display control device 200, there are a memory capacity, a data generation capability (=enabling the frame rate range to be set-up), the color signal type and the like.

Further, there are the products integrating the display control device 200 and the display device 212, but there is a case of combining the individual devices arbitrarily. There is a case of switching the device capabilities with software or a switch. For the data itself to be displayed, the characteristics can be converted by a signal processing. For example, in the general image processing software, there are readily provided several processing items such as the enlarging/contracting, the color conversion, the gamma characteristics, the edge enlightening, the averaging and the like, and an image quality may be varied by these set-ups.

As described above, since there are many factors affecting to the image display, it is desirable that, by preparing the means for managing an operation of the entire devices, this management means collect the information about the device structures of the entire devices and forces to implement the non-failure operations. Further, in the non-failure range, it is desirable to set up the conditions of which a user may use easily and see easily.

Figure 18:
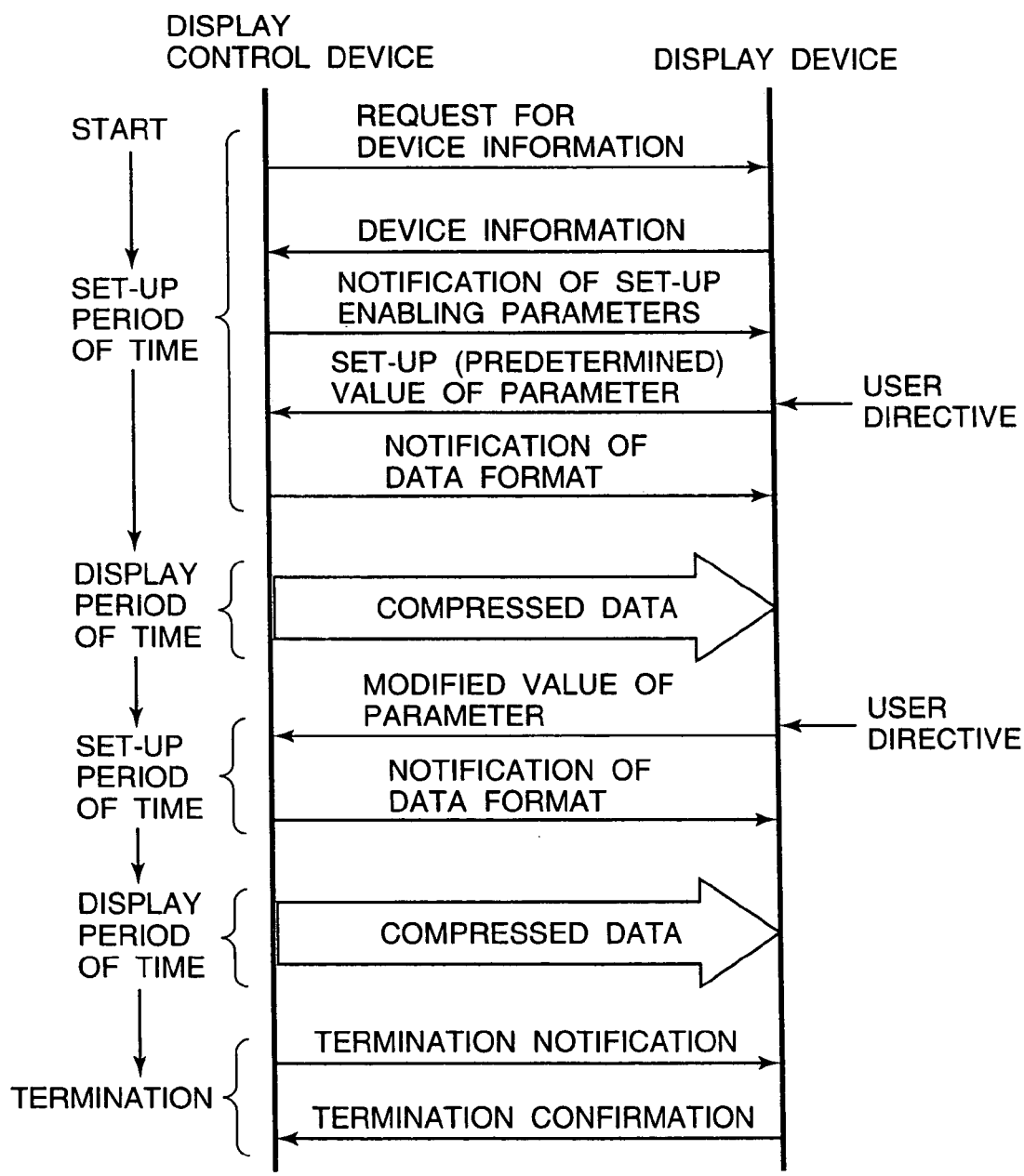
FIG. 18 is a diagram for illustrating a negotiation procedure of a device capability.

For example, as shown in FIG. 18, it is necessary to set up the negotiation procedures that exchange the capabilities between the devices. Making the device structure of which the display control device 200 and the display device 212 are connected with the signal line as an example, the negotiation procedures of the capabilities among the devices can be implemented by turning on the power supply by an operator, pressing down the reset button, the measurement result of the device characteristics, the measurement results of the environmental conditions, or the modification of the set-up conditions by the operator and the like, as a trigger.

There is a possibility for a certain type of the display 212 that the image quality may vary according to the aging or the environment conditions and the like, and a stabilization of the image quality can be implemented by preparing the means for feeding back these conditions as the device capabilities. Based on these device capabilities, the operation conditions can be set-up by the management means.

For example, when focusing on the device capabilities of the display control device 200, the display device 212 and the data transfer device 211, the set-up parameters of the compressed data type are, as shown in FIG. 3, there are the frame rate, the block size, the number of analogous colors, the area signal, and the clock, and the based on these, the compressed data generation control signal is generated.

For example, the amount of data-for displaying the RGB each pixel 8 bit signal of the VGA screen (640×480 pixels) becomes 921600 bites (=640×480×3). Here, if the upper limit of the frame rate "fup" of the display device itself is 60 frames/sec., and the capability of the data transfer device 211 is 40M bites/sec., then the data transfer device 211 becomes a constraint, and the displayable one becomes 43.4 frames/sec. (=40M bites/921600 bites).

If performing the data transfer with the compressed data type in which the compression rate is defined as 1/3, the data transfer device 211 does not become a constraint, but the condition "fup" (60 frames/sec.) of the frame rate of the display device 212 becomes a constraint. Here, if for the compression rate, setting the ratio of the amount of display data and the data transfer capability to 1.3824 (=640×480×3×60×40M bites), the maximum capabilities of both the data transfer device 211 and the display device 212 can be demonstrated. However, even if the average compression rate were the above-mentioned numerical value, in the compression system that may be varied with the image contents, for example, in the MPEG and the like, there would be a case that causes a trouble in the display.

On the contrary, in the present invention, by utilizing the compressed data type in which the compression rate of the pattern independent can be set-up, the parameter set-up can be performed based on the above-mentioned device capabilities, and thus an enhancement of the image quality can be implemented. Further, in practice, if it is difficult to accurately set-up the compression rate such as the above-mentioned numerical value example, for example, the set-up value close to the condition can be selected by preparing a correspondence table of the set-up parameters and the compression rates in advance.

The data to be transferred from the display control device 200 to the display device 212 can be implemented by the combinations of the device capability data for performing the above-mentioned negotiation procedures, the header information indicating the data contents to be transferred, the display data based on this header information, and the like.

For example, the device capability of the display device 212 may be constituted of the items as shown in FIG. 19. Further, as shown in FIG. 20, the header information and the display data can be integrated.

In the above-mentioned embodiment, it is described about the image display system, but an information processing device may be constituted by using the display control device 200 and the processor 210 as the control device of the information processing device, and generating the image information by the processor 210, and in the compressed data generation unit 200 of the display control device 200, generating the compressed data based on the frame rate and the image information, and in the controller constituted of the management unit 201 and the address generation unit 204, outputting the frame rate information to the compressed data generation unit and outputting the compressed data from the compressed data memory 203 to the image display device (display device 212) in response to the frame rate.

In the present embodiment, also, by varying the compression rate of the data in matching with the frame rate, an increase of the load of the data transfer can be suppressed, for an increase of the amount of data. More concretely, by enlarging the data compression rate in matching with an increase of the frame rate, the contrast conditions of the number of pixels and the frame rate can be eased.

Further, the display control device 200 may be also used as a control device for a television receiver. In this case, as the control device of the television receiver, it can be constituted of a receiving unit for receiving an image information (image information by the television broadcasting), a compressed data generation unit 202 for generating the compressed data based on the frame rate and the image information received by the receiving unit, and a controller (the management unit 201 and the address generation unit 204) for outputting the frame rate information to the compressed data generation unit, as well as for outputting the compressed data from the compressed data memory 203 to the image display device (CRT) in response to the frame rate.

In the present embodiment, an increase of the load of the data transfer can be suppressed, for an increase of the amount of data, by varying the compression rate of the data in matching with the frame rate. More concretely, by enlarging the data compression rate in matching with an increase of the frame rate, the contrast conditions of the number of pixels and the frame rate can be eased.

Figure 21:
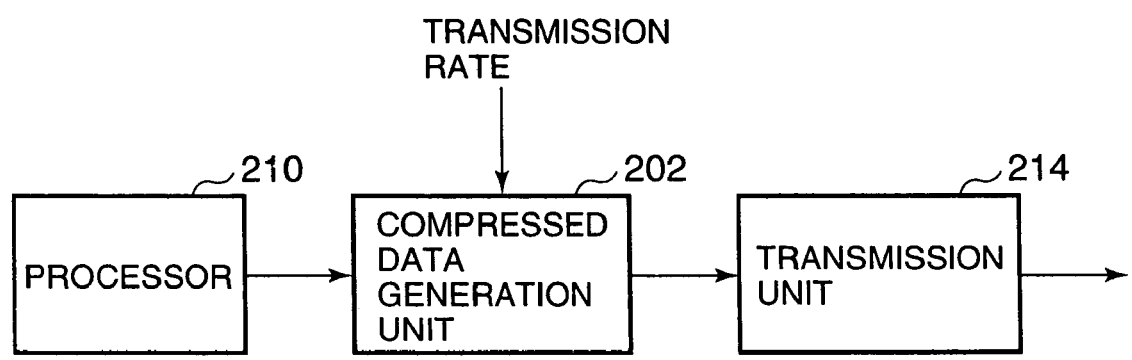
FIG. 21 is a block diagram showing a structure at a time when applying the present invention to a transmitter.

At a time when applying the display control device 200 to a transmitter, as shown in FIG. 21, it may be applied to the transmitter for transmitting the image information. This transmitter may be constituted of a processor 210 as an image information generation unit for generating the image information, a compressed data generation unit 202 for generating the compressed data in response to the image information and the transmission rate being set-up, and a transmitting unit 214 for transmitting the compressed data. In this case, as the transmission rate, if the data generation capability of the processor 210 is set up to 1M bits/sec. when the bit rate in the transmission line is set-up, for example, as 250 k bits/sec., then in the compressed data generation unit 202, in order to vary the compression rate in matching with the transmission rate, by compressing the data with the compression rate 1/4, for an increase of the amount of data, an increase of the load of the data transfer can be suppressed.

In the present embodiment, an increase of the load of the data transfer can be suppressed, for an increase of the amount of data, by varying the compression rate of the data in matching with the frame rate. More concretely, by enlarging the data compression rate in matching with an increase of the frame rate, the contrast conditions of the number of pixels and the frame rate can be eased.

At a time when applying the display control device 200 to an image distribution system, as shown in FIG. 22, it can be constituted of a processor (image information generation means) 210 for generating an image information, a compressed data generation device (compressing means) 218 for compressing the image information, in response to a distribution request from a user, an information about the image display device (display device 212) that the user has and the transmission rate that is set-up in the transmission device 216, a transmission device (transmitting means) 216 for transmitting the compressed image information, generated by the compressed data generation device 218, a recording device 220 as a recording means for recording the distribution request from the user, and the information about the image display device 212 that the user has through a communication line (including a telecommunication line and an optical communication line), as well as for recording the transmission rate on the recording medium, respectively, and an accounting device 222 as accounting means for processing the distribution request recorded on the recording medium of the recording device 220 or the information of the image display device 212, and for performing an accounting corresponding to the process results.

In the present embodiment, an increase of the load of the data transfer can be suppressed, for an increase of the amount of data, by varying the compression rate of the data in matching with the frame rate. More concretely, by enlarging the data compression rate in matching with an increase of the frame rate, the contrast conditions of the number of pixels and the frame rate can be eased.

As described above, according to the present invention, it is arranged to vary the compression rate of the data in matching with the frame rate, an increase of the load of the data transfer can be suppressed, for an increase of the amount of data.

The invention may be embodied in other specific forms without departing from the spirit or essential characteristics thereof. The present embodiments are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. A control device for using an image display device connected thereto, comprising:
    a compressed data generation unit to compress input image data in accordance with device capability information of said image display device, and to generate and output compressed image data;
    a compressed data memory to store said compressed image data output from said compressed data generation unit; and
    a controller arranged to provide said device capability information of said image display device to said compressed data generation unit, to control read-out timing of said compressed image data from said compressed data memory in accordance with said device capability information of said image display device, and to output said compressed image data read-out from said compressed data memory to said image display device;
    wherein said device capability information of said image display device is at least one of a screen size, a frame rate, a color filter arrangement and a color temperature of illumination; and
    wherein said compressed data generation unit changes a compression ratio in accordance with said device capability information of said image display device, and compresses said input image data by compressing each block comprising a plurality of pixels of said input image data at the changed compression ratio.

2. The control device according to claim 1 wherein said device capability information of said image display device is set previously in accordance with said image display device connected thereto.

3. The control device according to claim 1 further comprising a receiving unit for receiving said device capability information of said image display device from said image display device.

4. The control device according to claim 3, wherein said device capability information of said image display device is received by said receiving unit through a transmitting line from said image display device.

* * * * *